United States Patent
Falkenberg

(10) Patent No.: US 12,432,727 B2
(45) Date of Patent: Sep. 30, 2025

(54) SIDELINK USER EQUIPMENT (UE) CAPABILITY SIGNALING ENHANCEMENT

(71) Applicant: Toyota Jidosha Kabushiki Kaisha, Aichi-ken (JP)

(72) Inventor: Andreas Falkenberg, Escondido, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 712 days.

(21) Appl. No.: 17/456,472

(22) Filed: Nov. 24, 2021

(65) Prior Publication Data
US 2024/0064740 A1 Feb. 22, 2024

Related U.S. Application Data

(60) Provisional application No. 63/118,375, filed on Nov. 25, 2020.

(51) Int. Cl.
*H04W 72/20* (2023.01)
*H04W 72/044* (2023.01)
*H04W 72/23* (2023.01)
*H04W 76/14* (2018.01)
*H04W 76/15* (2018.01)

(52) U.S. Cl.
CPC ......... *H04W 72/20* (2023.01); *H04W 72/044* (2013.01); *H04W 72/23* (2023.01); *H04W 76/14* (2018.02); *H04W 76/15* (2018.02)

(58) Field of Classification Search
None
See application file for complete search history.

(56) References Cited

U.S. PATENT DOCUMENTS

| | | | |
|---|---|---|---|
| 2019/0215685 A1* | 7/2019 | Wang | H04W 4/40 |
| 2020/0374858 A1* | 11/2020 | Vargas | H04B 7/0617 |
| 2020/0396599 A1* | 12/2020 | Luo | H04W 76/27 |
| 2021/0329445 A1* | 10/2021 | Zhang | H04W 8/22 |
| 2022/0345282 A1* | 10/2022 | Back | H04W 72/04 |

OTHER PUBLICATIONS

ETSI TS 138 306, "Technical Specification: User Equipment (UE) radio access capabilities", 3GPP TS 38.306 version 15.2.0, Release 15, Sep. 2018, 31 pages, downloadable from http://www.etsi.org/standards-search.

(Continued)

*Primary Examiner* — Hong S Cho
(74) *Attorney, Agent, or Firm* — Finnegan, Henderson, Farabow, Garrett, and Dunner, LLP

(57) ABSTRACT

A system, method and apparatus for wireless communications is provided. A user equipment (UE) transmit a capability message comprising an information element indicating that the first UE is capable of establishing multiple sidelinks with at one additional UE. The UE receives one or more radio resource control (RRC) messages comprising configuration parameters for establishing multiple sidelinks with the at least one additional UE. The UE establishes communications with the at least one additional UE using the multiple sidelinks based on the received configuration parameters.

39 Claims, 19 Drawing Sheets

(56) References Cited

OTHER PUBLICATIONS

ETSI TS 138 331, "Technical Specification: Radio Resource Control (RRC); Protocol specification", 3GPP TS 38.331 version 15.3.0, Release 15, Oct. 2018, 441 pages (split into 3 parts), downloadable from http://www.etsi.org/standards-search.
ETSI TS 138 306, "5G; NR; User Equipment (UE) radio access capabilities" 3GPP TS 38.306 version 15.12.0 Release 15, (Jan. 2021). 70 pages. downloadable from http://www.etsi.org/standards-search.
ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296), downloadable from http://www.etsi.org/standards-search.
Etsi TS 138 331, "5G: NR; Radio Resource Control (RRC); Protocol specification", 3GPP TS 38.331 version 16.1.0 Release 16, (Jul. 2020), 886 pages, (part 2, pp. 297-591), downloadable from http://www.etsi.org/standards-search.
ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886), downloadable from http://www.etsi.org/standards-search.

\* cited by examiner

| Transport channel<br>Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel<br>Logical channel | UL-SCH | RACH |
|---|---|---|
| CCCH | X | |
| DCCH | X | |
| DTCH | X | |

FIG. 3B

| Transport channel<br>Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

SIDELINK USER EQUIPMENT (UE) CAPABILITY SIGNALING ENHANCEMENT

CROSS-REFERENCE TO RELATED APPLICATION

This application claims the benefit of U.S. Provisional Application No. 63/118,375, entitled "SIDELINK USER EQUIPMENT (UE) CAPABILITY SIGNALING ENHANCEMENT", and filed on Nov. 25, 2020. U.S. Provisional Application No. 63/118,375 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
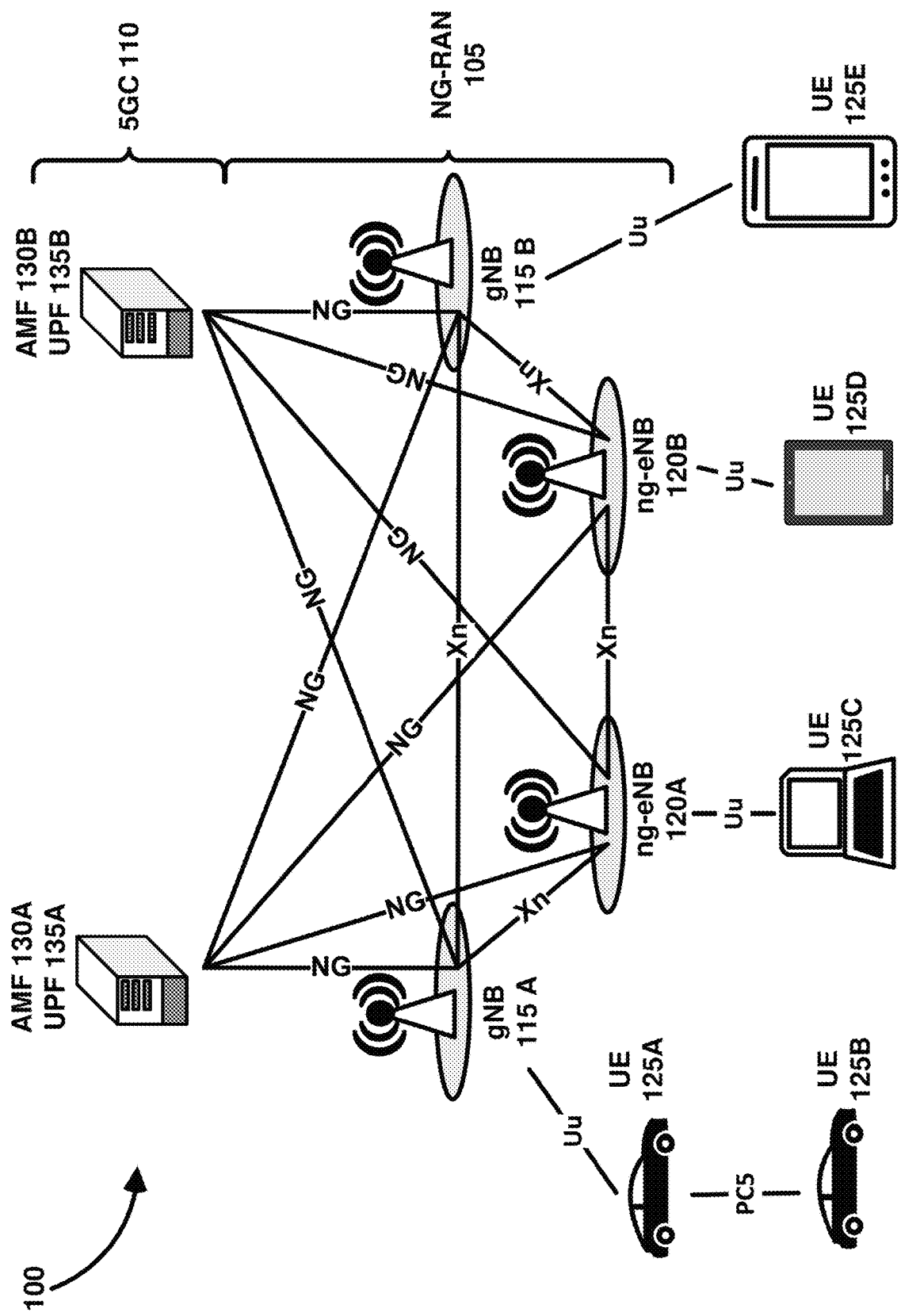
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing &, forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
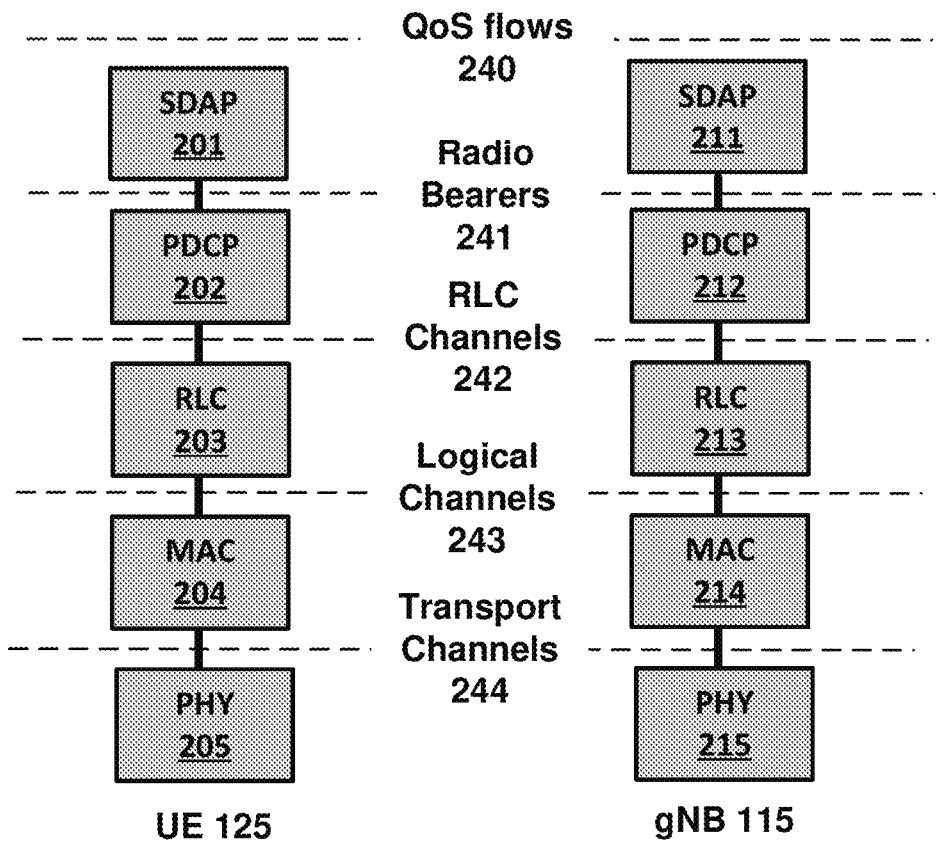
FIG. 2A and FIG. 2B show examples of radio protocol stacks for user plane and control plane, respectively, according to some aspects of some of various exemplary embodiments of the present disclosure.
Figure 2B:
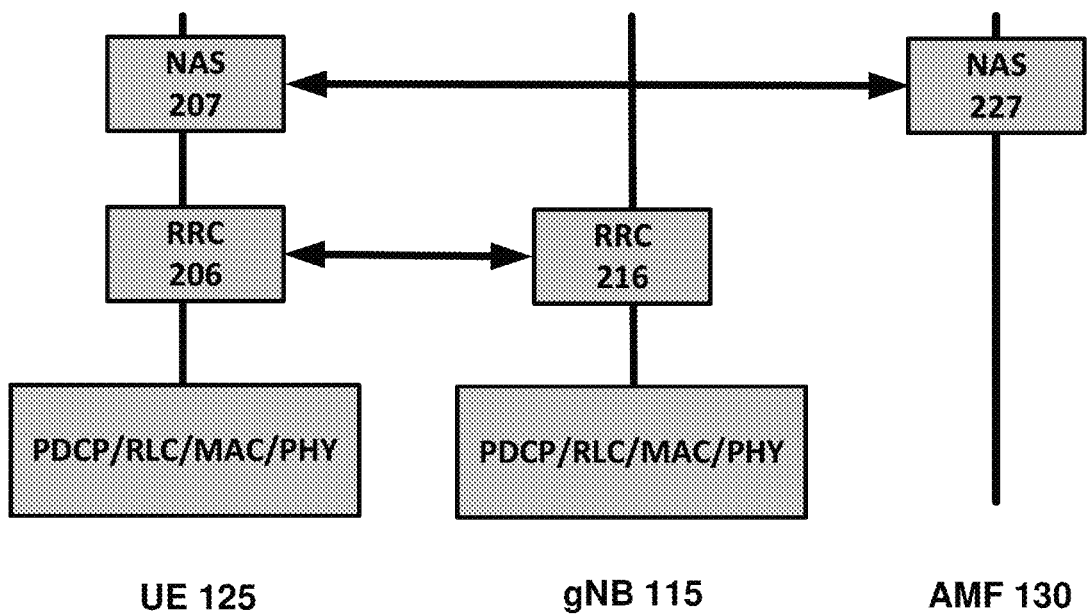

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer.

Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern (s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
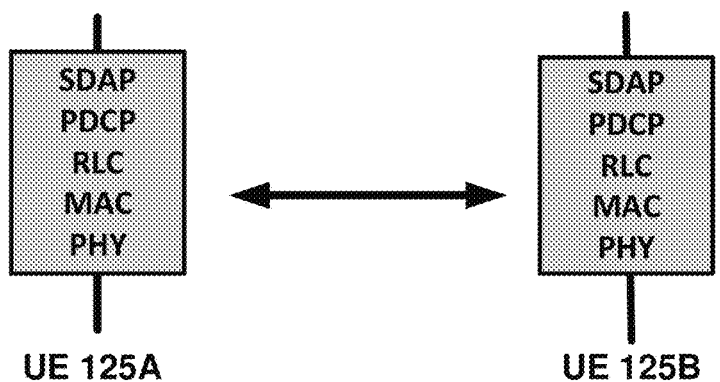
FIG. 5A, FIG. 5B, FIG. 5C and FIG. 5D show examples of radio protocol stacks for NR sidelink communication according to some aspects of some of various exemplary embodiments of the present disclosure.
Figure 5B:
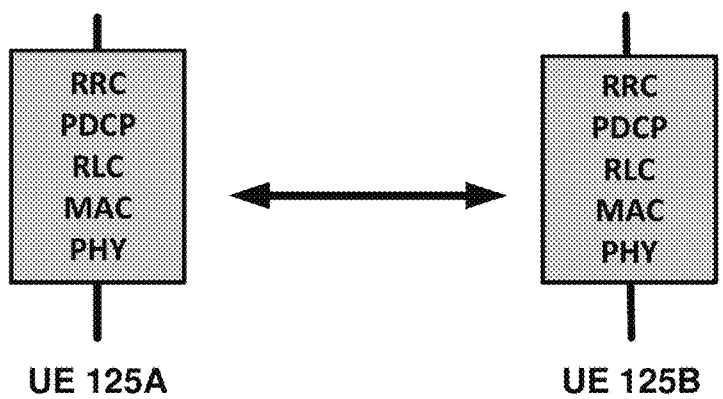
Figure 5C:
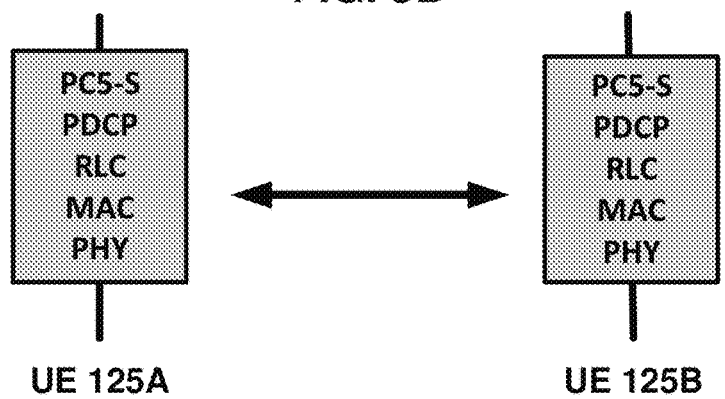
Figure 5D:
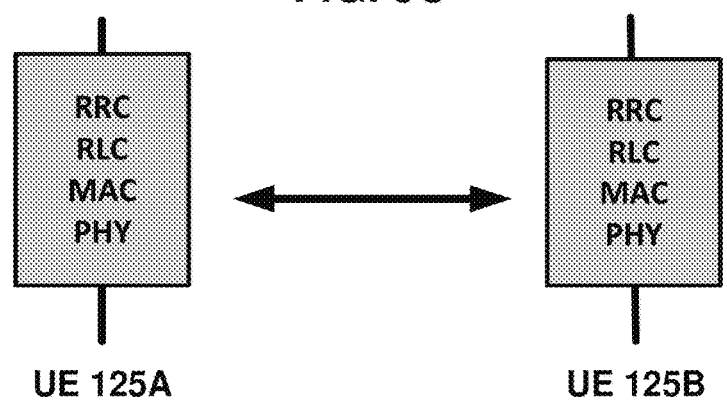

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
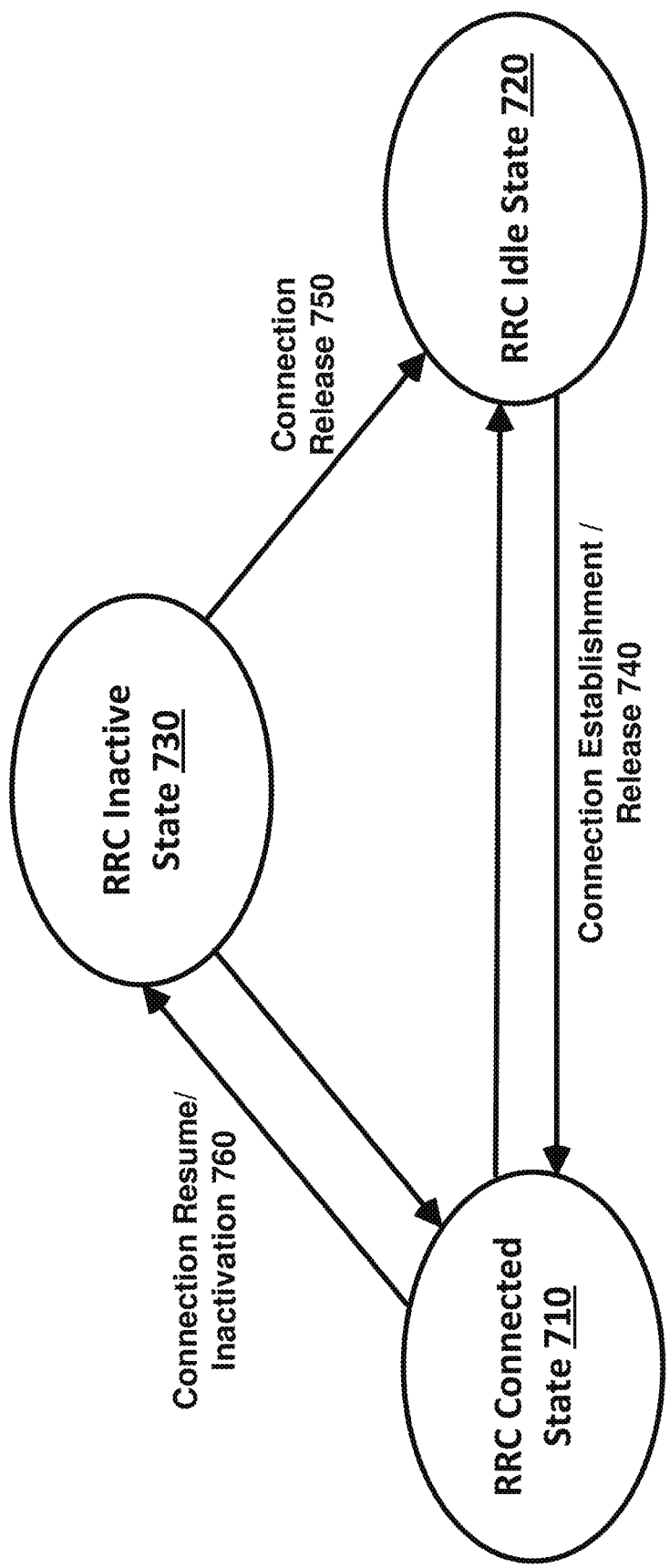
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
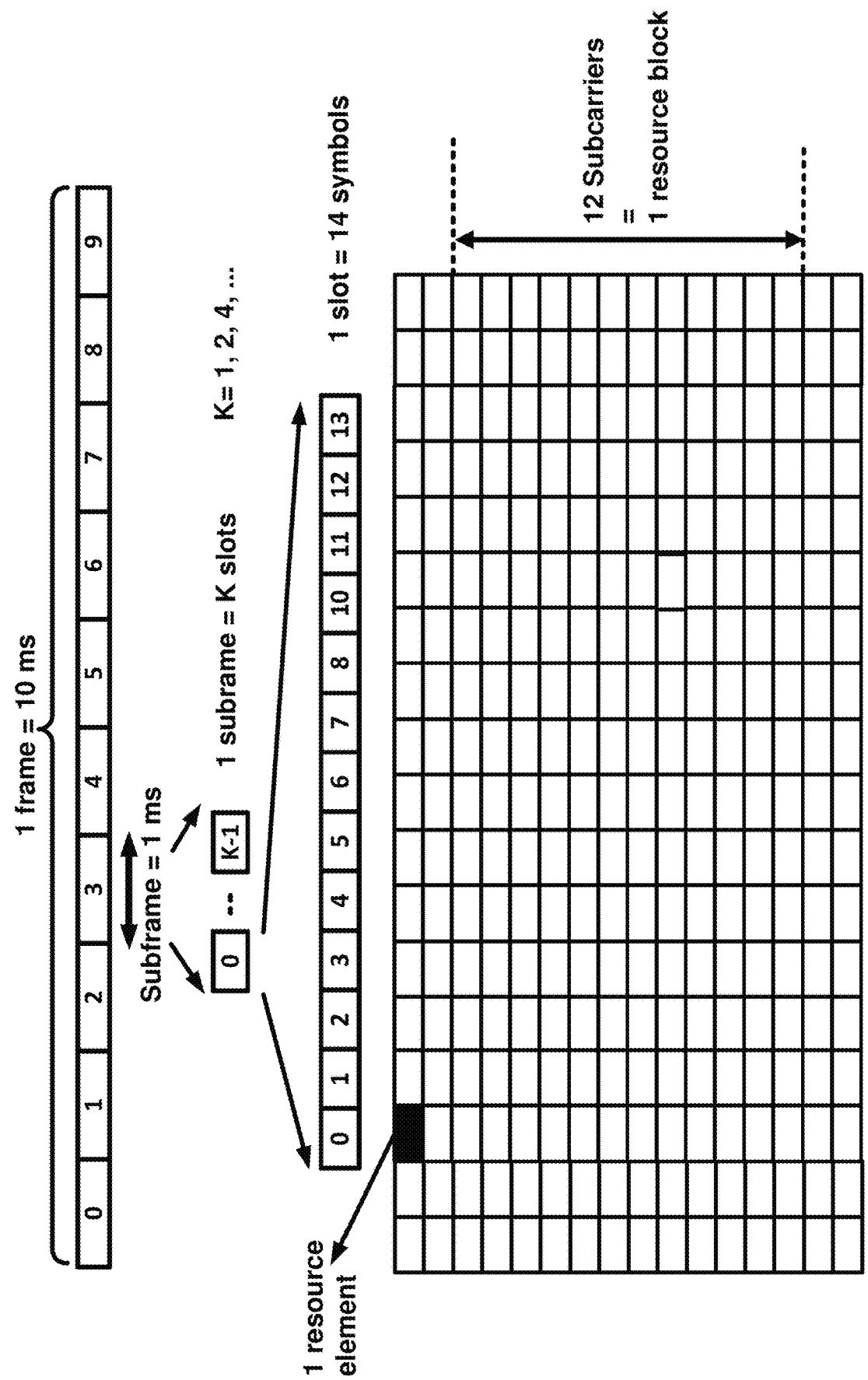
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
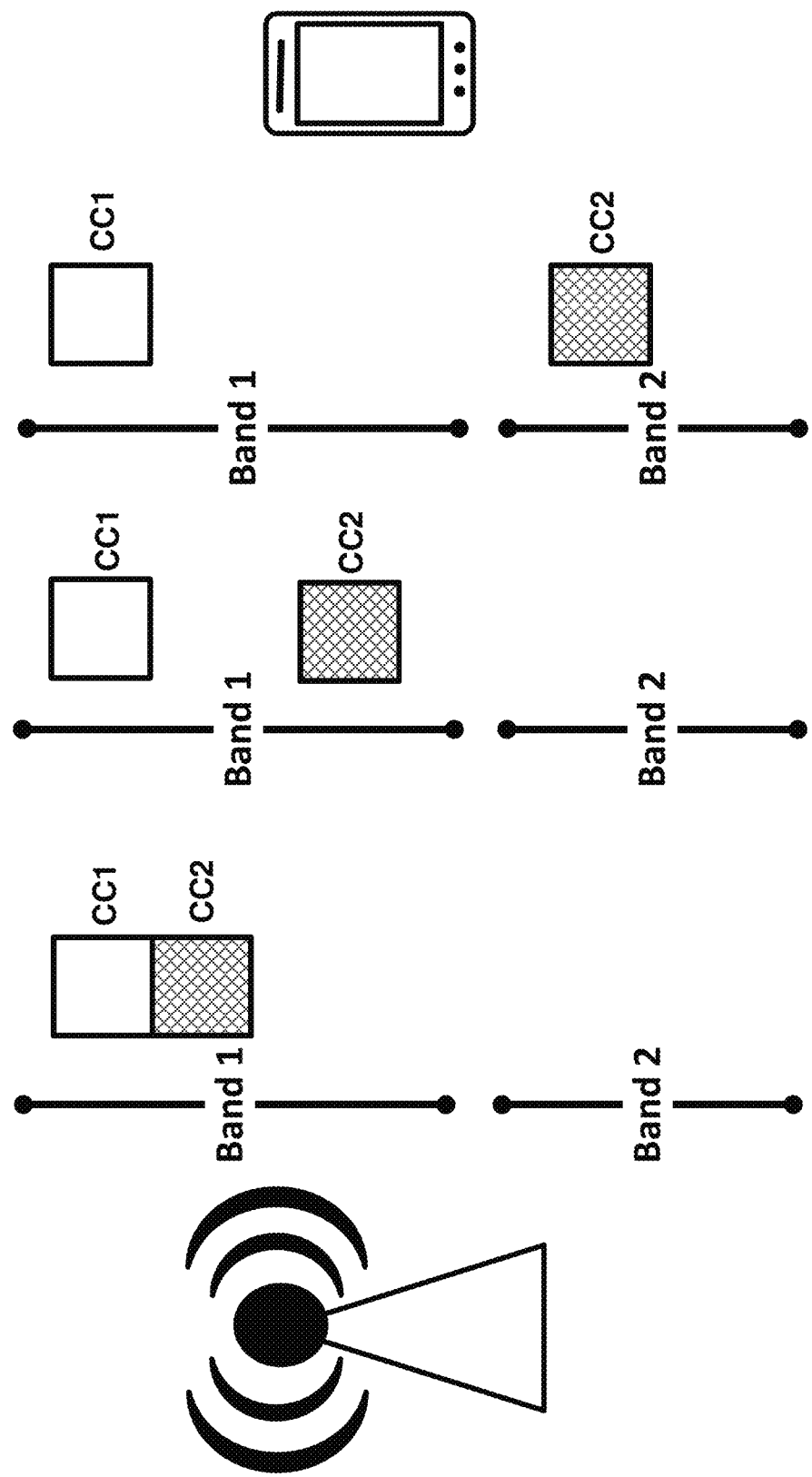
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
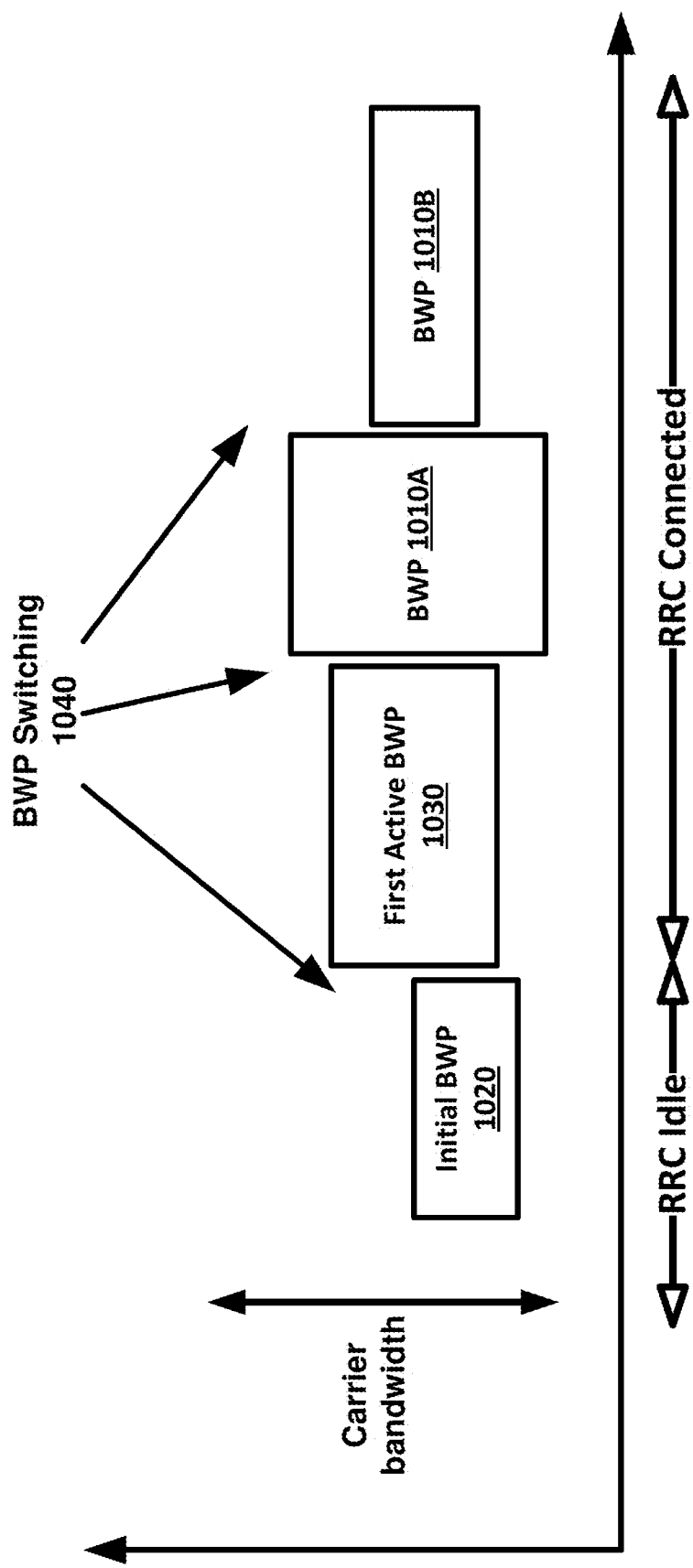
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
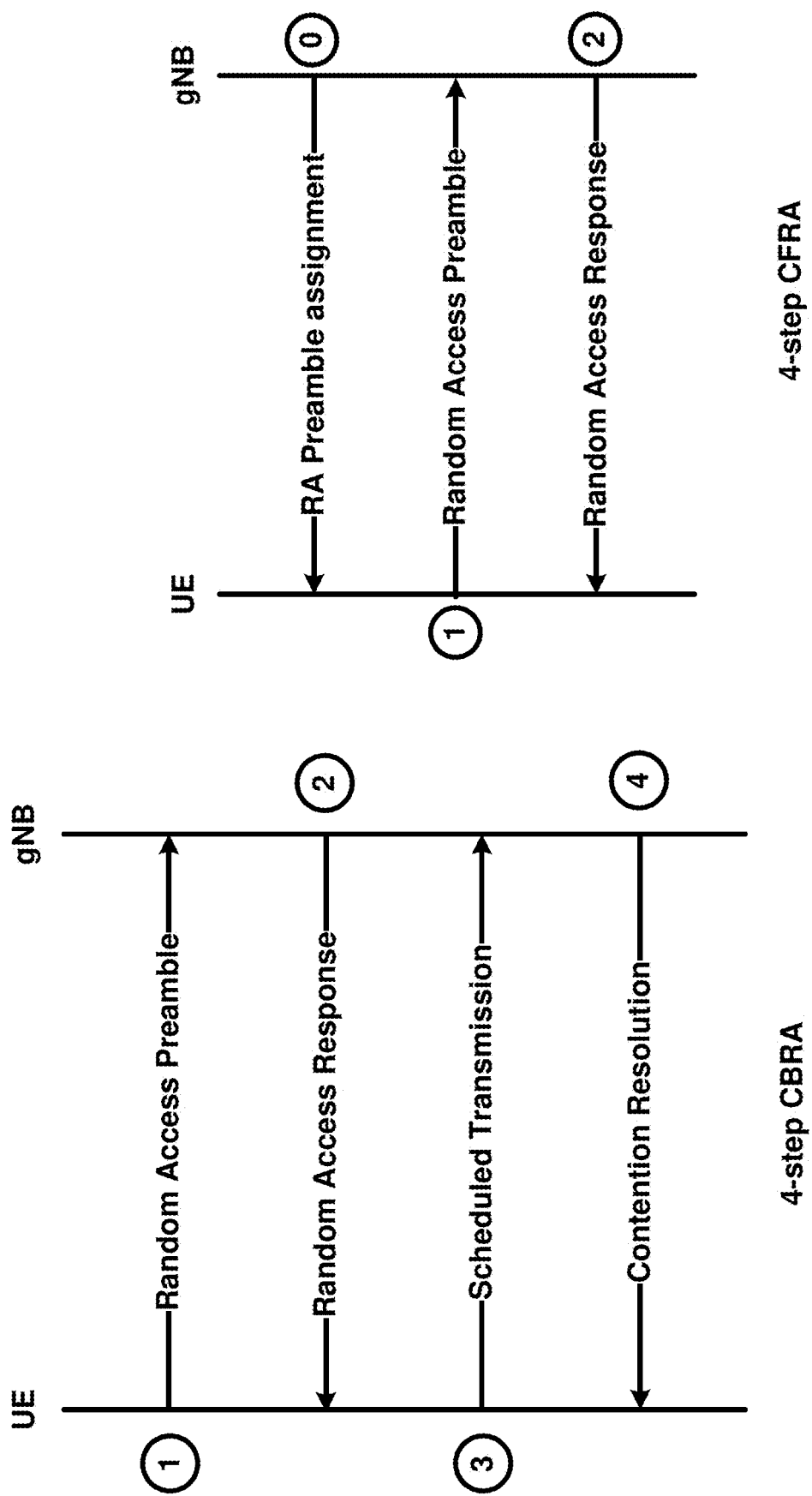
FIG. 11 shows example four-step contention-based and contention-free random access processes according to some aspects of some of various exemplary embodiments of the present disclosure.
Figure 12:
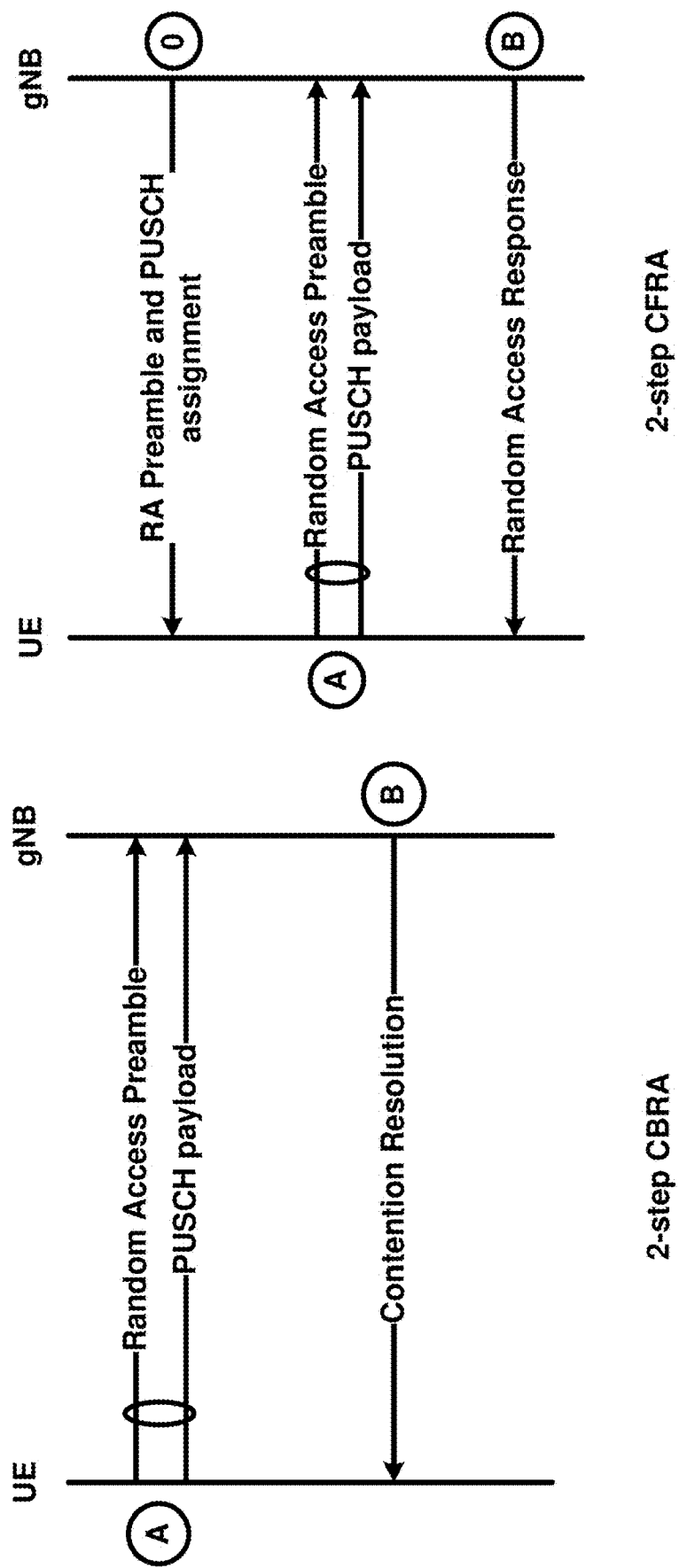
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
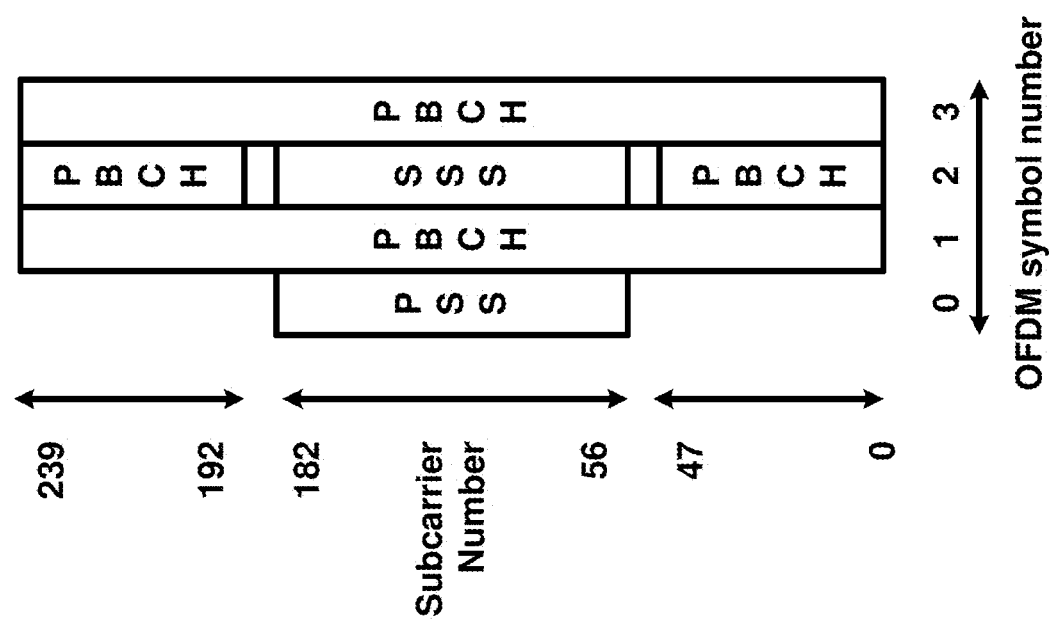
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
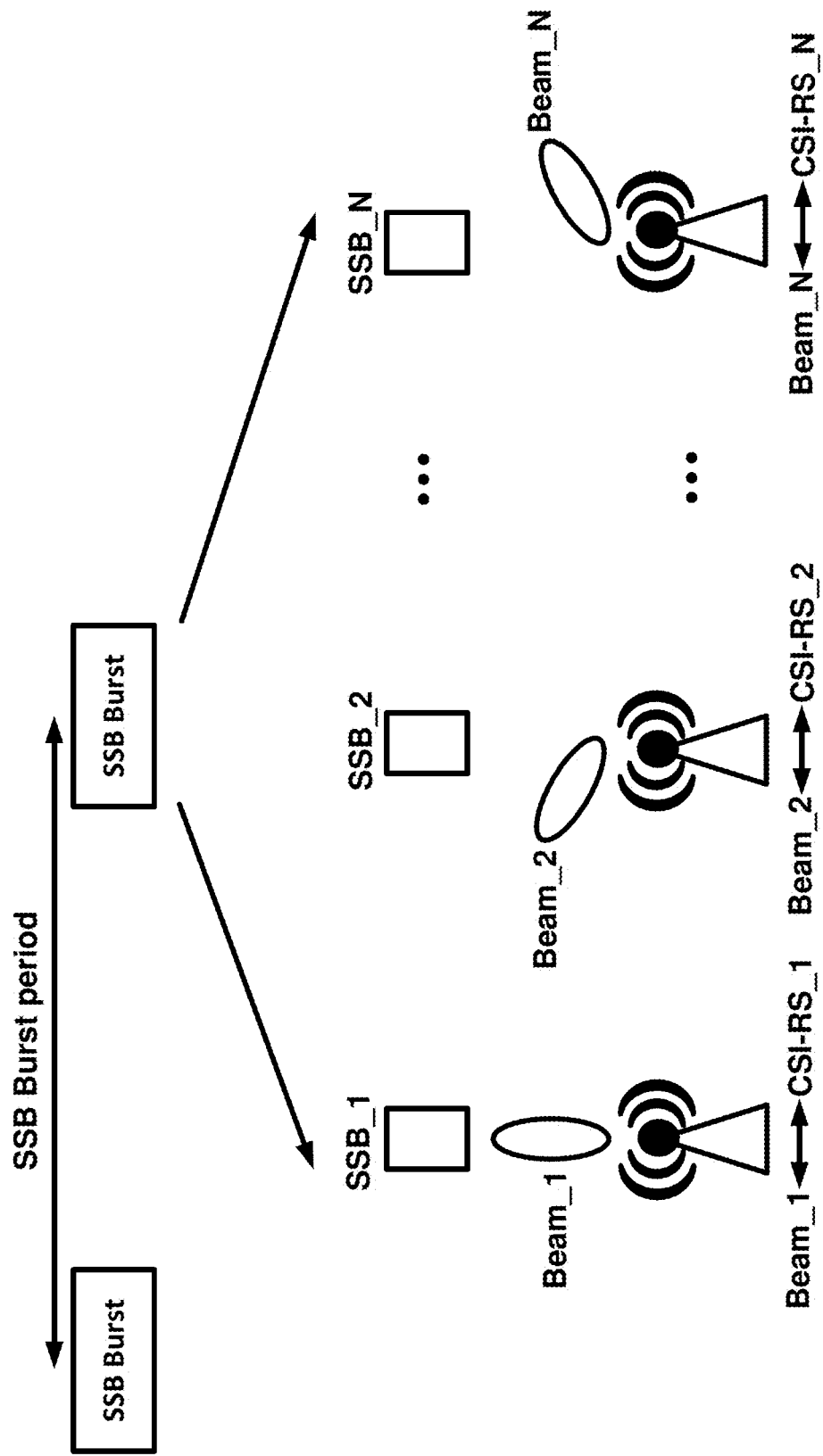
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
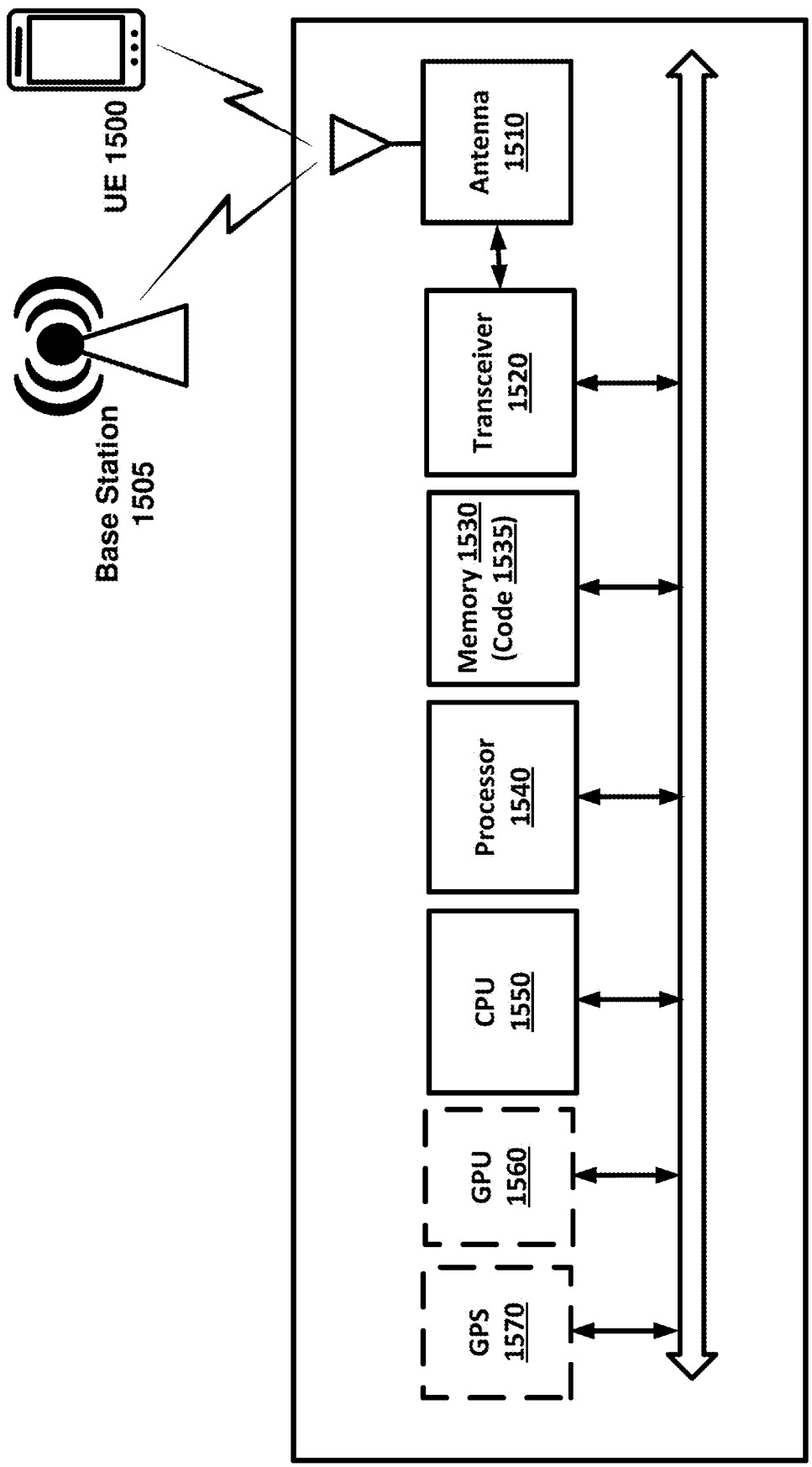
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

Figure 16:
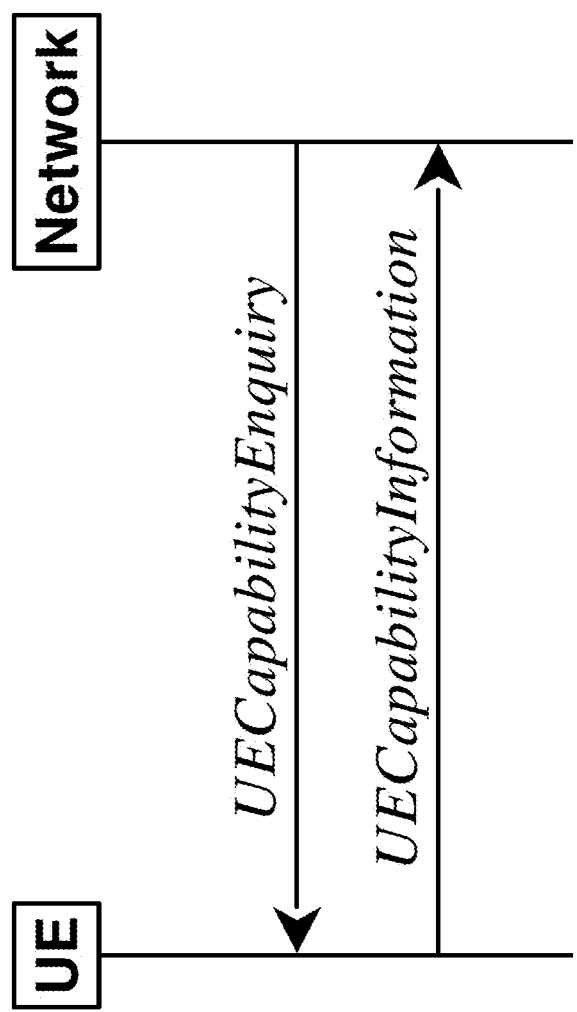
FIG. 16 shows an example capability transfer procedure according to some aspects of some of various exemplary embodiments of the present disclosure.

In some examples as shown in FIG. 16, a UE may compile and transfers its UE capability information upon receiving a UECapabilityEnquiry from the network. This procedure may be referred to as a UE capability transfer procedure.

The network may initiate the UE capability transfer procedure to a UE in RRC_CONNECTED when it needs (e.g., additional) UE radio access capability information. The network may retrieve UE capabilities after access stratum (AS) security activation. Network may not forward UE capabilities that were retrieved before AS security activation to the core network (CN).

In some examples, the UE may set the contents of UECapabilityInformation message as follows: If the ue-CapabilityRAT-RequestList contains a UE-CapabilityRAT-Request with rat-Type set to nr: the UE may include in the ue-CapabilityRAT-ContainerList a UE-CapabilityRAT-Container of the type UE-NR-Capability and with the rat-Type set to nr; and the UE may include the supportedBandCombinationList, featureSets and featureSetCombinations. If the ue-CapabilityRAT-RequestList contains a UE-CapabilityRAT-Request with rat-Type set to eutra-nr: if the UE supports (NG)EN-DC or NE-DC: the UE may include in the ue-CapabilityRAT-ContainerList a UE-CapabilityRAT-Container of the type UE-MRDC-Capability and with the rat-Type set to eutra-nr; and the UE may include the supportedBandCombinationList and featureSetCombinations. If the ue-CapabilityRAT-RequestList contains a UE-CapabilityRAT-Request with rat-Type set to eutra: if the UE supports E-UTRA: the UE may include in the ue-CapabilityRAT-ContainerList a ue-CapabilityRAT-Container of the type UE-EUTRA-Capability and with the rat-Type set to eutra, according to the capabilityRequestFilter, if received. If the ue-CapabilityRAT-RequestList contains a UE-CapabilityRAT-Request with rat-Type set to utra-fdd: if the UE supports UTRA-FDD: the UE may include the UE radio access capabilities for UTRA-FDD within a ue-CapabilityRAT-Container and with the rat-Type set to utra-fdd.

If the RRC message segmentation is enabled based on the field rrc-SegAllowed received, and the encoded RRC message is larger than the maximum supported size of a PDCP SDU, the UE may initiate the UL message segment transfer procedure. Otherwise, the UE may submit the UECapabilityInformation message to lower layers for transmission, upon which the procedure may end.

In some examples, the UL-DCCH-Message class may be the set of RRC messages that may be sent from the UE to the network on the uplink DCCH logical channel. The UL-DCCH-Message may include a UECapabilityInformation message.

In some examples, a UE message segment transfer procedure may be used to transfer segments of UL DCCH messages from UE to a NG-RAN in RRC_CONNECTED. The segmentation of UL DCCH message may be applicable to UECapabilityInformation. A UE capable of UL RRC message segmentation in RRC_CONNECTED may initiate the procedure when the following conditions are met: if the RRC message segmentation is enabled based on the field rrc-SegAllowed received, and if the encoded RRC message is larger than the maximum supported size of a PDCP SDU. Upon initiating the procedure, the UE may initiate transmission of the ULDedicatedMessageSegment message.

In some examples, the UECapabilityEnquiry message may be used to request UE radio access capabilities for NR as well as for other RATs. In some examples, the IE UECapabilityInformation message may be used to transfer UE radio access capabilities requested by the network.

In some examples, an IE SL-BWP-Config may be used to configure the UE specific NR sidelink communication on one particular sidelink bandwidth part. A sl-BWP-Generic field may indicate the generic parameters on the configured sidelink BWP. A sl-BWP-PoolConfig field may indicate the resource pool configurations on the configured sidelink BWP. A sl-LengthSymbols field may indicate the number of symbols used for sidelink in a slot without SL-SSB. A sl-StartSymbol field may indicate the starting symbol used for sidelink in a slot without SL-SSB. A sl-TxDirectCurrentLocation field may indicate the sidelink Tx/Rx Direct Current location for the carrier.

In some examples, a IE SL-BWP-ConfigCommon may be used to configure the cell-specific configuration information on one particular sidelink bandwidth part. A genericParameters field may indicate the generic parameters on the configured sidelink BWP. A sl-BWP-PoolConfigCommon field may indicate the resource pool In some examples, an IE SL-BWP-PoolConfig may be used to configure NR sidelink communication resource pool. A sl-RxPool field may indicate the receiving resource pool on the configured BWP. For the PSFCH related configuration, if configured, may be used for PSFCH transmission/reception. If the field is included, it may replace any previous list, i.e. all the entries of the list are replaced and each of the SL-ResourcePool entries is considered to be newly created. A sl-TxPoolExceptional field may indicate the resources by which the UE is allowed to transmit NR sidelink communication in exceptional conditions on the configured BWP. For the PSFCH related configuration, if configured, may be used for PSFCH transmission/reception. A sl-TxPoolScheduling field may indicate the resources by which the UE is allowed to transmit NR sidelink communication based on network scheduling on the configured BWP. For the PSFCH related configuration, if configured, may be used for PSFCH transmission/reception. A sl-TxPoolSelectedNormal field may indicate the resources by which the UE is allowed to transmit NR sidelink communication by UE autonomous resource selection on the configured BWP. For the PSFCH related configuration, if configured, may be used for PSFCH transmission/reception.

In some examples, the IE SL-BWP-PoolConfigCommon may be used to configure the cell-specific NR sidelink communication resource pool.

In some examples, the IE SL-ConfigDedicatedNR may specify the dedicated configuration information for NR sidelink communication. A sl-MeasConfigInfoToAddModList field may indicate the RSRP measurement configurations for unicast destinations to add and/or modify. A sl-MeasConfigInfoToReleaseList field may indicate the RSRP measurement configurations for unicast destinations to remove. A sl-RadioBearerToAddModList field may indicate one or multiple sidelink radio bearer configurations. A sl-FreqInfoToAddModList field may indicate the NR sidelink communication configuration on some carrier frequency (ies). A sl-ScheduledConfig field may indicate the configuration for UE to transmit NR sidelink communication based on network scheduling.

In some examples, the IE SL-ConfiguredGrantConfig may specify the configured grant configuration information for NR sidelink communication. A sl-ConfigIndexCG field may indicate the ID to identify configured grant for sidelink.

In some example, the IE SL-FreqConfig may specify the dedicated configuration information on one particular carrier frequency for NR sidelink communication. A sl-BWP-ToAddModList field may indicate the list of sidelink BWP(s) on which the NR sidelink communication configuration is to be added or reconfigured. A sl-BWP-ToReleaseList field may indicate the list of sidelink BWP(s) on which the NR sidelink communication configuration is to be released. A sl-Freq-Id field may indicate the identity of the SL-FreqConfig configuration. A sl-SCS-SpecificCarrierList field may indicate a set of UE specific channel bandwidth and location configurations for different subcarrier spacings (numerologies). The UE may use the configuration provided in this field for the purpose of channel bandwidth and location determination.

In some examples, the IE FreqConfigCommon may specify the cell-specific configuration information on one particular carrier frequency for NR sidelink communication. A sl-BWP-List field may indicate the list of sidelink BWP(s) on which the NR sidelink communication configuration.

In some examples, the IE SL-LogicalChannelConfig may be used to configure the sidelink logical channel parameters.

In some examples, the IE SL-MeasConfigCommon may be used to set the cell specific SL RSRP measurement configurations for unicast destionations.

In some examples, the IE SL-MeasConfigInfo may be used to set RSRP measurement configurations for unicast destinations.

In some examples, an IE SL-RadioBearerConfig may specify the sidelink DRB configuration information for NR sidelink communication.

In some examples, an IE SL-ReportConfigList may concern a list of SL measurement reporting configurations to add or modify for a destination.

In some examples, the IE SL-ResourcePool may specify the configuration information for NR sidelink communication resource pool. A sl-NumSubchannel field may indicate the number of subchannels in the corresponding resource pool, which may consist of contiguous PRBs only. A sl-RB-Number field may indicate the number of PRBs in the corresponding resource pool, which may consist of contiguous PRBs only. A sl-StartRB-Subchannel field may indicate the lowest RB index of the subchannel with the lowest index in the resource pool with respect to the lowest RB index of a SL BWP. A sl-SubchannelSize field may indicate the minimum granularity in frequency domain for the sensing for PSSCH resource selection in the unit of PRB.

In some examples, an IE SL-RLC-BearerConfig may specify the SL RLC bearer configuration information for NR sidelink communication.

In some examples, an IE SL-RadioBearerConfigIndex may be used to identify a SL RLC bearer configuration.

In some examples, an IE SL-ScheduledConfig may specify sidelink communication configurations used for network scheduled NR sidelink communication. A sl-CS-RNTI field may indicate the RNTI used to scramble CRC of DCI format 3_0. A sl-PSFCH-ToPUCCH field may for dynamic grant and configured grant type 2, configure the values of the PSFCH to PUCCH gap. A sl-RNTI field may indicate the C-RNTI used for monitoring the network scheduling to transmit NR sidelink communication (e.g., the mode 1).

In some examples, an accessStratumReleaseSidelink capability parameter may indicate the access stratum release for NR sidelink communication the UE supports. In some examples, an outOfOrderDeliverySidelink capability parameter may indicate whether UE supports out of order delivery of data to upper layers by PDCP for sidelink. In some examples, a multipleConfiguredGrantsSidelink capability parameter may indicate whether the UE supports 8 SR configurations per PUCCH cell group. In some examples, a multipleConfiguredGrantsSidelink capability parameters may indicate whether UE supports 8 sidelink configured grant configurations (including both Type 1 and Type 2) in a resource pool. If absent, for each resource pool, the UE may support one sidelink configured grant configuration. In some examples, a supportedBandCombinationListSidelinkEUTRA-NR capability parameter may define the supported NR sidelink communication and/or V2X sidelink communication band combinations by the UE. A fallback band combination resulting from the reported sidelink band combination may be supported by the UE. In some examples, a supportedBandCombinationListSidelinkNR capability parameter may define the supported joint NR sidelink communication band combinations by the UE. A fallback band combination resulting from the reported sidelink band combination may be supported by the UE. In some examples, a supportedBandListSidelink capability parameter may indicate frequency bands supported for NR sidelink communications and parameters supported for each frequency band. In some examples, a sl-Reception capability parameter may indicate whether receiving NR sidelink communication is supported. In some examples, a sl-TransmissionMode1 capability parameter may indicate whether transmitting NR sidelink mode 1 scheduled by Uu is supported. In some examples, a sync-Sidelink capability parameter may indicate whether UE supports synchronization sources for NR sidelink. In some examples, a sl-Tx-256QAM capability parameter may indicate that a UE can transmit PSSCH according to the 256QAM MCS table. In some examples, a psfch-FormatZeroSidelink capability parameter may indicate whether UE supports PSFCH format 0. In some examples, a lowSE-64QAM-MCS-TableSidelink capability parameter may indicate UE can transmit and receive PSSCH according to the low-spectral efficiency 64QAM MCS table. In some examples, a enb-Sync-Sidelink capability parameter may indicate whether UE supports eNB type synchronization source for NR sidelink.

In some examples, a supportedBandListSidelinkEUTRA capability parameter may indicate E-UTRA frequency bands supported for V2X sidelink communications and parameters supported for each frequency band. In some examples, a gnb-ScheduledMode3SidelinkEUTRA capability parameter may indicate whether transmitting V2X sidelink communication mode 3 scheduled by NR Uu is supported. In some examples, a gnb-ScheduledMode4SidelinkEUTRA capability parameter may indicate whether the UE can be scheduled by gNB for V2X sidelink mode 4 transmission. This field may be applicable if the UE supports V2X sidelink communication.

A UE may have hardware/RF/software limitations on whether the UE supports multiple sidelinks (e.g., simultaneous sidelinks) on a subchannel or a BWP or a carrier or multiple carriers configured for the UE. A UE may have hardware/RF/software limitations on the number of sidelinks (e.g., simultaneous sidelinks) on a subchannel or a BWP or a carrier or multiple carriers configured for the UE. Furthermore, existing capability signaling (e.g., sidelink related capability signaling) is between a UE and a BS (e.g., over the Uu interface) and not over the PC-5 interface. Example embodiments enhance the existing capability signaling for sidelink communications.

In example embodiments, UE capability information elements may be transmitted via a capability message by a UE to a base station. The capability message may be transmitted in a capability transfer procedure or during an initial attach procedure and based on a random access process. The UE capability information elements may indicate that the UE is capable of simultaneously supporting multiple sidelinks (e.g., multiple sidelinks on a single carrier or on multiple carriers). Furthermore, one or more information elements may indicate whether the UE is capable of supporting sidelink and uplink simultaneously or capable of supporting sidelink and downlink simultaneously. In some examples, the capability signaling associated UE sidelink capabilities may be transferred between UEs and/or between a UE and a base station.

In some examples, a UE may initiate capability signaling if the NR and/or E-UTRA network requests UE capabilities for nr, eutra-nr, eutra, etc. The capability signaling may be initiated once per requested rat-Type. The UE may ensure that the feature set IDs are consistent across feature sets, feature set combinations and band combinations in all three UE capability containers that the network queries with the same fields with the same values, e.g., UE-CapabilityRequestFilterNR, UE-CapabilityRequestFilterCommon and fields in UECapabilityEnquiry message (e.g., requestedFreqBandsNR-MRDC, requestedCapabilityNR, eutra-nr-only flag, and requestedCapabilityCommon).

In some examples, in case that a network connection is not available and one UE is communicating with other UE(s), one of the UEs may request the capabilities of UEs in the vicinity. This may support the building of a network without the need of network connection in the first place. It may support the build-up of ad hoc networks, emergency networks and PTT services, which may be required in emergency cases and/or when the network is not available.

In some examples, a UE sidelink capability transfer procedure may enable reporting capabilities of a UE regarding the sidelink capabilities. The transmission of sidelink capabilities may enable the parallel transmission of multiple sidelinks.

In some examples, the following actions may be defined assuming that multiple UE may connect into one cluster. A subset of the UEs in the cluster may have multiple sidelink transmissions in parallel. In some examples, a subset may have a parallel uplink/downlink transmission. A set of n UEs may be UE[0] . . . UE[n−1]. UE[0] may send a UE sidelink capability request for SL capabilities. A receiving UE[1] may provide UE sidelink capability information which may contain one or more of: a list of supported carriers and bands and their combination specific for sidelink, bandwidth capabilities for sidelinks, other available features of the sidelink of that UE, and a list of UE which are connected to UE[1].

In some examples, a UE[2] may be already connected with UE[1] via another sidelink and UE[0] may request additional information. UE[0] may send a "indirect" UE sidelink capability request message to UE[2] via UE[1]. Since UE[1] has already all the information of UE[2] it may transfer that information back to UE[0]. The UE[0] may decide to use that indirect link to transfer information to UE[2] via UE[1] if a certain capability is needed. In some examples, if another UE (e.g., UE[3]) provides the sidelink capability information the UE[0] may independently consider the information of UE[3].

The sidelink capability information of the sidelink capabilities for UE[0] may be stored in a list as follows:

```
sidelinkCapabilityList =
[
    sidelinkCapability[1],
    sidelinkCapability[2],
    ...
    sidelinkCapability[n-1]
]
``` where each sidelinkCapability entry may include the information of that sidelink. A UE may use the sidelink capability information to establish one or more sidelink communications with one or more UEs.

In some examples, capability signaling associated with sidelink communications may be exchanged between UEs as well as between a UE and a base station. In some examples, when the base station requests information then it also gets information of sidelink connections of a particular UE. The base station may request the capability for example from UE[0]. The sidelink capability list may be transmitted which may show the information of UE[0] and a list of sidelink capabilities of the other UEs and their associated sidelinks. In some examples, the format may contain the above information and may include the UE specific capability information elements associated with sidelink. An example format is shown below:

```
capabilityInformation =
{
    UEcapability, / / / this is the information of this UE as defined already
in the standard [4]
    [
        sidelinkCapability[1], / / / this is information of UEs connected to
        UE[0]
        sidelinkCapability[2],
        ...
        sidelinkCapability[n-1]
    ]
}
```

In some examples, the UE capability message may include sidelink capability information elements associated to other UEs connected to the UE. For example, UE[0] . . . UE[n-1] may be already connected in a cluster via their sidelinks. The UE[0] may get into the coverage area of a base station. The base station may request the capability information which is sent by the UE[0]. UE[0] may sends the sidelink capability information of its connected devices UE[1] . . . UE[n-1]. The capability information may be sent as a complete message for example as shown below:

```
capabilityInformation =
{
    UEcapability,
    [
        sidelinkCapability[1],
        sidelinkCapability[2],
        ...
        sidelinkCapability[n-1]
    ]
}
```

In some examples, the capabilities may be reported recursively. Say a UE[0] is requesting information from UE[1] which may be connected to UE[2] and UE[3] and UE[3] is connected to UE[4]. A recursive reporting would have the capability information defined as follows: The UE[1] may report the following:

```
sidelinkCapability[1] =
{
    UEcapability, / / / this is the requested UE capability of UE[1]
    [
        sidelinkCapability[2],   / / capability based on the sidelink between
UE[1] and UE[2]
        sidelinkCapability[3]    / / capability based on the sideline between
UE[1] and UE[3]
    ]
}
```

In some examples, sidelink resource allocation and/or scheduling procedures may be based on UE capabilities on whether the UE supports multiple sidelinks (e.g., simultaneous sidelinks) on one or more BWPs/Carriers and/or a maximum number of sidelinks (e.g., simultaneous sidelinks) on one or more BWPs/Carriers. In some examples, the configuration (e.g., configuration to enable or disable) or use of a DCI format may be based on the UE sidelink capabilities.

Figure 17:
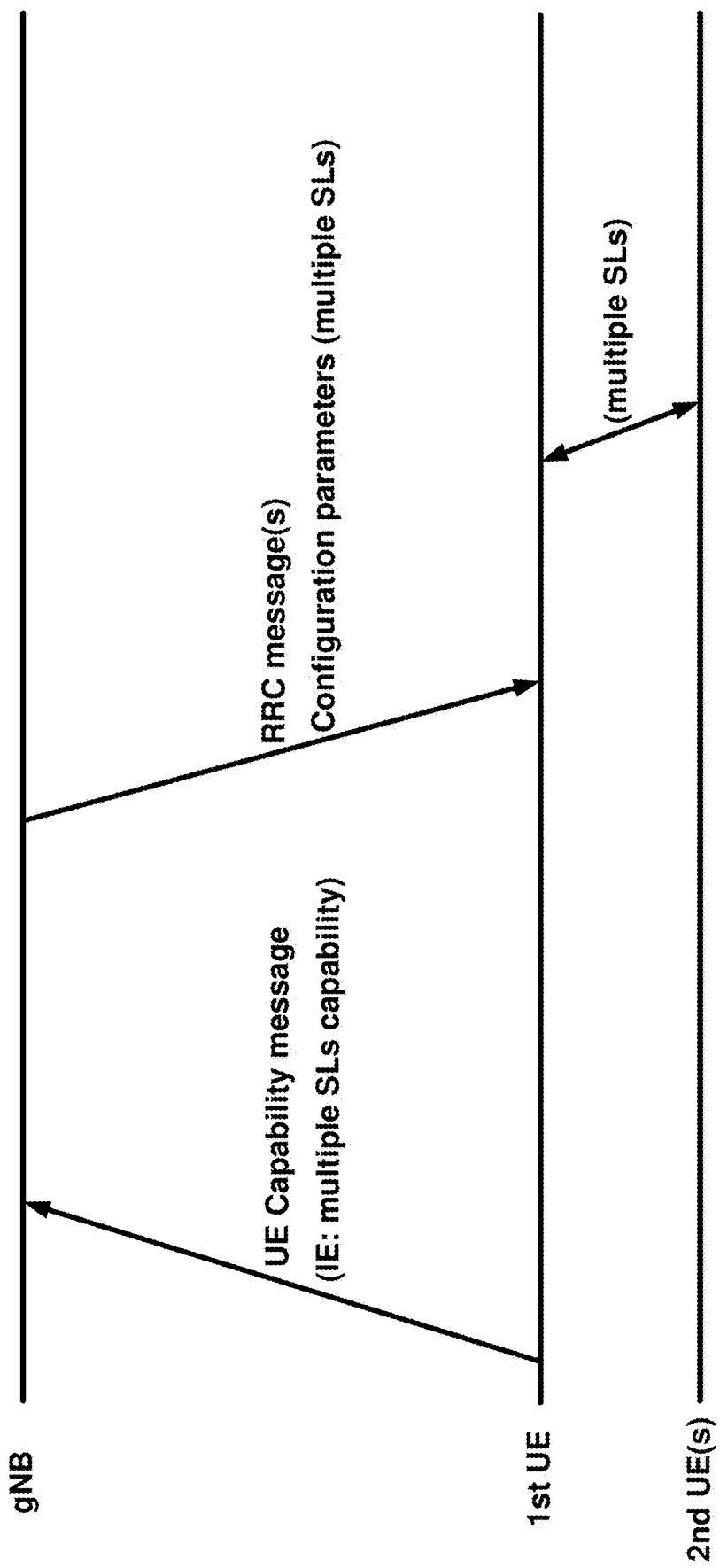
FIG. 17 shows an example process according to some aspects of some of various exemplary embodiments of the present disclosure.

In an example embodiment as shown in FIG. 17, a first UE may transmit a capability message (e.g., a UECapabilityInformation message) to a base station. In some examples, the transmission of the UE capability message may be based a capability transfer procedure (e.g., in response to reception of a capability enquiry message, which may also be referred to as a capability query message). The capability query message may comprise a radio access technology type set to new radio (NR). In some examples, the capability query message may indicate (e.g., based on a request IE included in the capability query message) that the request is for sidelink capabilities. In some examples, the transmission of the capability message may be during an initial attach procedure (e.g., based on a random access process (e.g., based on a MsgA of a two-step random access process or a Msg3 of a four step random access process) for the initial attach procedure).

The capability message may include information elements (IEs) associated with UE capabilities on sidelink communications. The IEs associated with sidelink communication capabilities of the first UE may include an IE indicating that the UE is capable of establishing multiple (e.g., simultaneous) sidelinks (for example capable of establishing multiple sidelinks across carriers configured for the first UE, or capable of establishing multiple sidelinks in a carrier of one or more carriers configured for the first UE. The IE can also indicate that the first UE is capable of establishing multiple sidelinks in a BWP of multiple BWPs of a carrier of one or more carriers configured for the first UE, or capable of establishing multiple sidelinks in a subcannel/resource pool of one or more subchannels/resource pools of a BWP of one or more BWPs of a carrier of one or more carriers configured for the first UE).

In response to transmitting the capability message, the first UE may receive one or more RRC messages comprising configuration parameters. The configuration parameters may be for establishing multiple sidelinks by the first UE with at least one additional UE, such as one or more second UEs. For example, based on the capability message indicating that the first UE is capable of establishing multiple (e.g., simultaneous) sidelinks across carriers of the first UE, the configuration parameters may be for establishing multiple (e.g., simultaneous) sidelinks across carriers of the first UE. For example, based on the capability message indicating that the first UE is capable of establishing multiple (e.g., simultaneous) sidelinks in a carrier of one or more carries of the first UE, the configuration parameters may be for establishing multiple (e.g., simultaneous) sidelinks in a carrier of one or more carries of the first UE. In another example, based on the capability message indicating that the first UE is capable of establishing multiple (e.g., simultaneous) sidelinks in a BWP of one or more BWPs of a carrier of one or more carries of the first UE, the configuration parameters may be for establishing multiple (e.g., simultaneous) sidelinks in a BWP of one or more BWPs of a carrier of one or more carries of the first UE. In a further example, based on the capability message indicating that the first UE is capable of establishing multiple (e.g., simultaneous) sidelinks in a subchannel/resource pool of a BWP of one or more BWPs of a carrier of one or more carries of the first UE, the configuration parameters may be for establishing multiple (e.g., simultaneous) sidelinks in a subchannel/resource pool of a BWP of one or more BWPs of a carrier of one or more carries of the first UE.

In some examples, the configuration parameters may comprise first parameters for resource pools configuration (e.g., across different carriers or in a carrier or in a BWP, for example based on the capabilities of the first UE indicated by the capability message). The resource pools may be configured for SL communications. A resource pool in the resource pools may be for reception of sidelink signals and/or channels or may be for transmission of sidelink signals and channels. The first configuration parameters of a first resource pool, in the resource pools, may comprise frequency configuration of the first resource pool. The frequency configuration may be associated with an identifier/identity and may indicate radio resources (e.g., frequency domain resources of the first resource pool). The configuration parameters may further comprise sidelink BWP configuration parameters (e.g., numerology, frequency domain resources, etc.). The configuration parameters may further comprise sidelink radio bearer configuration parameters.

The first UE may utilize the configuration parameters and may communicate with one or more second UEs over multiple sidelinks using the configuration parameters.

In some examples, the one or more RRC messages may further comprise a first parameter/IE indicating that a first DCI format is enabled/setup for the first UE. The first DCI format may be associated with SL scheduling. In some examples, the first DCI format may be used for scheduling multiple sidelink transmissions on multiple sidelinks and/or may indicate a sidelink, of the multiple sidelinks, as the scheduled sidelink. In some examples, the first DCI may indicate an identifier of a sidelink, in multiple sidelinks. For example, the first DCI may comprise a field indicating an identifier of the sidelink in the multiple sidelinks.

In some examples, the first UE may receive a DCI (e.g., a DCI of a first format) comprising scheduling information for sidelink transmissions on multiple sidelinks. In some example, the first UE may receive a DCI comprising a field indicating an identifier of one or multiple sidelinks to which the scheduling information is addressed to.

Figure 18:
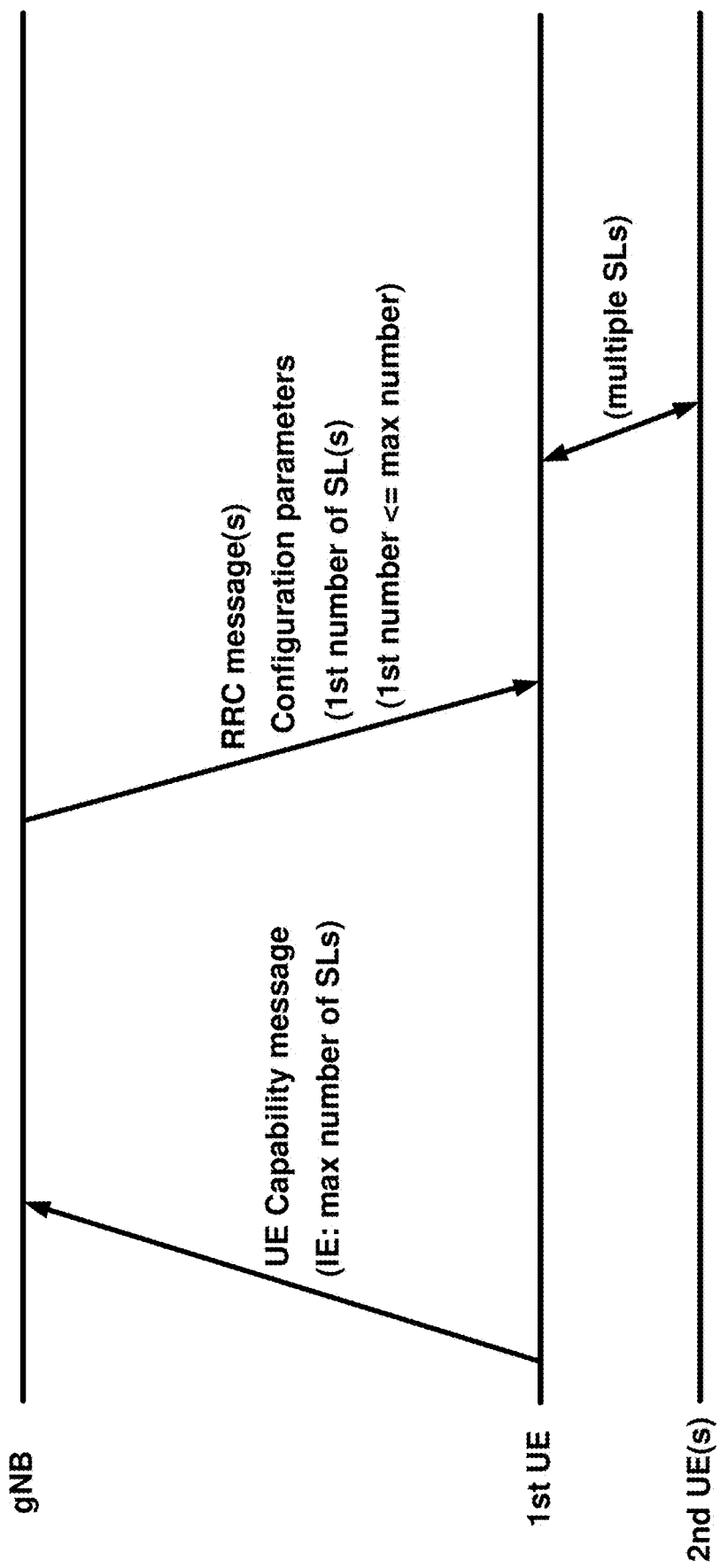
FIG. 18 shows an example process according to some aspects of some of various exemplary embodiments of the present disclosure.

In an example embodiment as shown in FIG. 18, a first UE may transmit a capability message (e.g., a UECapabilityInformation message) to a base station. In some examples, the transmission of the UE capability message may be based a capability transfer procedure (e.g., in response to reception of a capability query message). The capability query message may comprise a radio access technology type set to new radio (NR). In some examples, the capability query message may indicate (e.g., based on a request IE included in the capability query message) that the request is for sidelink capabilities. In some examples, the transmission of the capability message may be during an initial attach procedure (e.g., based on a random access process (e.g., based on a MsgA of a two-step random access process or a Msg3 of a four step random access process) for the initial attach procedure). The capability message may include information elements (IEs) associated with UE capabilities on sidelink communications. The IEs associated with sidelink communication capabilities of the first UE may include an IE indicating a maximum number of sidelinks that the first UE is capable of establishing with one or more second UEs. In some examples, the maximum number of sidelinks may be across carriers configured for the first UE, or in a carrier of one or more carriers configured for the first UE, or in a BWP of one or more BWPs of a carrier of one or more carriers of the first UE, or in a subchannel of a BWP of one or more BWPs of a carrier of one or more carriers of the first UE.

In response to transmitting the capability message, the first UE may receive one or more RRC messages comprising configuration parameters. The configuration parameters may be for establishing a first number of sidelinks by the first UE with one or more second UEs. The first number of sidelinks may be smaller than or equal to the maximum number of sidelinks that the UE is capable of supporting.

The first UE may utilize the configuration parameters and may communicate with one or more second UEs over the first number of sidelinks using the configuration parameters.

Figure 19:
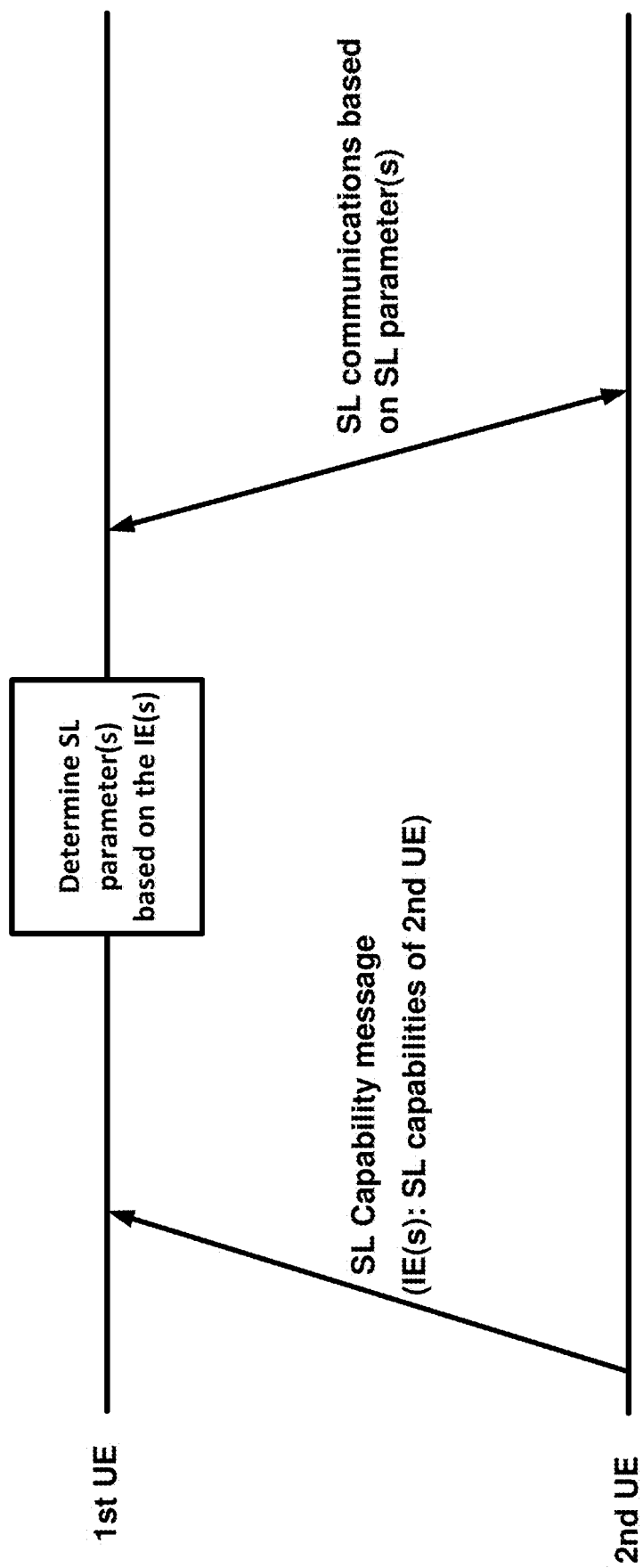
FIG. 19 shows an example process according to some aspects of some of various exemplary embodiments of the present disclosure.

In an example embodiment as shown in FIG. 19, a first UE may receive a sidelink capability message from a second UE. In some examples, the reception of the sidelink capability message from the second UE may be based on a sidelink capability transfer procedure (e.g., capability signaling over the PC-5 interface). For example, the first UE may receive a sidelink capability message from the second UE in response to transmission of a sidelink query message by the first UE. The sidelink capability message may comprise one or more information elements associated with sidelink communication capabilities of the second UE. The one or more information elements may indicate various sidelink capability parameters of the second UE (e.g., list of supported carriers for sidelink communications, a list of supported bands for sidelink communications, a list of supported band combinations for sidelink, sidelink related bandwidth capabilities, other sidelink capabilities of the second UE). In some examples, the one or more information elements may indicate a maximum number of sidelinks (across multiple carriers, a single carrier, a single BWP, a single subchannel, etc.) supported by the second UE and/or may indicate whether the second UE supports multiple sidelinks (across multiple carriers, a single carrier, a single BWP, a single subchannel, etc.). In some examples, the sidelink capability message may further comprise one or more second information elements associated with sidelink communication of a third UE. The second UE may receive the one or more second information elements (e.g., in a second capability message) that may be received by the second UE from the third UE. The first UE may determine one or more sidelink parameters, for sidelink communications with the second UE, based on the one or more information elements. The first UE may communicate with the second UE based on the determined sidelink communication parameters.

In an embodiment, a first user equipment (UE) may transmit to a base station, a capability message comprising an information element indicating that the first UE is capable of establishing multiple sidelinks with one or more second UEs. The first UE may receive from the base station and in response to transmitting the capability message, one or more radio resource control (RRC) messages comprising configuration parameters for establishing multiple sidelinks with one or more second UEs. The first UE may communicate with the one or more second UEs using the multiple sidelinks and based on the configuration parameters.

In some embodiments, transmitting the capability message, by the first UE, may be in response to receiving a capability query message from the base station in a capability transfer procedure. In some embodiments, the capability query message may comprise a radio access technology type information element set to new radio (NR). In some embodiments, the capability query message may comprise an information element indicating a request for sidelink capability information.

In some embodiments, transmitting the capability message, by the first UE, may be based on an initial attach procedure. In some embodiments, transmitting the capability message, by the first UE, may be based on a random access process in the initial attach procedure.

In some embodiments, the information element in the capability message may indicate that the first UE is capable of establishing multiple sidelinks with the one or more second UEs via a single carrier. In some embodiments, the configuration parameters may be for establishing the multiple sidelinks with the one or more second UEs via a single carrier.

In some embodiments, the information element may indicate that the first UE is capable of establishing multiple sidelinks with the one or more second UEs via multiple bandwidth parts (BWPs) of a single carrier. In some embodiments, the configuration parameters may be for establishing the multiple sidelinks with the one or more second UEs via multiple bandwidth parts (BWPs) of a single carrier.

In some embodiments, the information element may indicate that the first UE is capable of establishing multiple sidelinks with the one or more second UEs via multiple subchannels of a single bandwidth part (BWP) of a single carrier. In some embodiments, the configuration parameters may be for establishing the multiple sidelinks with the one or more second UEs via multiple subchannels of a single bandwidth part (BWP) of a single carrier.

In some embodiments, the information element may indicate that the first UE is capable of establishing multiple sidelinks with the one or more second UEs via a plurality of carriers. In some embodiments, the configuration parameters may be for establishing the multiple sidelinks with the one or more second UEs via a plurality of carriers.

In some embodiments, the configuration parameters may comprise resource pool configuration parameters of a plurality of resource pools for the multiple sidelinks. In some embodiments, a first resource pool, of the plurality of resource pools, may be for reception, by the first user equipment (UE), of sidelink signals and sidelink channels associated with a first sidelink of the multiple sidelinks. In some embodiments, a second resource pool, of the plurality of resource pools, may be for transmission, by the first UE, of sidelink signals and sidelink channels associated with the first sidelink.

In some embodiments, first configuration parameters of a first resource pool, of the plurality of resource pools, comprise frequency configuration of the first resource pool. In some embodiments, the frequency configuration may comprise a sidelink frequency identifier indicating an identity of the frequency configuration. In some embodiments, the frequency configuration may indicate radio resources associated with the first resource pool.

In some embodiments, the configuration parameters may comprise sidelink bandwidth part configuration parameters.

In some embodiments, the configuration parameters may comprise sidelink radio bearer configuration parameters.

In some embodiments, the one or more radio resource control (RRC) messages may further comprise a first parameter indicating that a downlink control information (DCI) of a first format is configured for the first user equipment (UE) for scheduling sidelink channel transmissions on multiple sidelinks.

In some embodiments, the first UE may receive a downlink control information (DCI) comprising scheduling information for sidelink transmissions on multiple sidelinks. In some embodiments, the downlink control information (DCI) may be of a first format.

In an embodiment, a first user equipment (UE) may transmit to a base station, a capability message comprising an information element indicating a maximum number of sidelinks that the first UE is capable of establishing with one or more second UEs. The first UE may receive from the base station, one or more radio resource control (RRC) messages comprising configuration parameters for establishing a first number of sidelinks with one or more second UEs, wherein the first number may be smaller than or equal to the maximum number. The first UE may communicate with the one or more second UEs using the first number of sidelinks and based on the configuration parameters.

In some embodiments, transmitting the capability message, by the first UE, may be in response to receiving a capability query message from the base station in a capability transfer procedure. In some embodiments, the capability query message may comprise a radio access technology type information element set to new radio (NR). In some embodiments, the capability query message may comprise an information element indicating a request for sidelink capability information.

In some embodiments, transmitting the capability message, by the first UE, may be based on an initial attach procedure. In some embodiments, transmitting the capability message, by the first UE, may be based on a random access process in the initial attach procedure.

In some embodiments, the maximum number of sidelinks may be for sidelinks across all carriers configured for the first user equipment (UE).

In some embodiments, the maximum number of sidelinks may be for sidelinks on a single carrier of the first user equipment (UE).

In some embodiments, the maximum number of sidelinks may be for sidelinks on a single bandwidth part (BWP) of a single carrier of the first user equipment (UE).

In some embodiments, the maximum number of sidelinks may be for sidelinks on a single subchannel of a single bandwidth part (BWP) of a single carrier of the first user equipment (UE).

In an embodiment, a first user equipment (UE) may receive from a second UE, a sidelink capability message comprising one or more information elements associated with sidelink communication capabilities of the second UE. In some embodiments, the first UE may determine one or more sidelink communication parameters based on the one or more information elements. The first UE may communicate with the second UE, via one or more sidelinks and based on the determined sidelink communication parameters.

In some embodiments, the receiving the sidelink capability message from the second user equipment (UE) may be in response to transmitting a sidelink capability query message.

In some embodiments, the sidelink capability message may further comprise one or more second information elements associated with sidelink communication capabilities of a third UE, wherein the one or more second information elements may be received by the second UE from the third UE.

In some embodiments, the one or more information elements may indicate one or more of: a list of supported carriers for sidelink communications; a list of supported bands for sidelink communications; a list of supported band combination for sidelink; bandwidth capabilities for sidelink communications; and one or more sidelink features.

In some embodiments, the one or more information elements may indicate a maximum number of sidelinks supported by the second user equipment (UE).

In some embodiments, the one or more information elements may indicate that the second user equipment (UE) is capable of supporting multiple sidelinks.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of capability signaling for sidelink communications comprising:
 transmitting, by a first user equipment (UE), a capability message comprising an information element indicating that the first UE is capable of establishing multiple sidelinks with at least one additional UE;

receiving, by the first UE from the base station, in response to transmitting the capability message, at least one radio resource control (RRC) messages comprising configuration parameters for establishing multiple sidelinks with the at least one additional UE; and communicating, by the first UE, with the at least one additional UE using the multiple sidelinks based on the received configuration parameters.

Clause 2. The method of Clause 1, wherein transmitting the capability message includes transmitting the capability message in response to the first UE receiving a capability query message from the base station in a capability transfer procedure.

Clause 3. The method of Clause 2, wherein the capability query message comprises a radio access technology type information element set to new radio (NR).

Clause 4. The method of Clause 2, wherein the capability query message comprises an information element indicating a request for sidelink capability information.

Clause 5. The method of Clause 1, wherein transmitting the capability message includes transmitting the capability message based on an initial attach procedure.

Clause 6. The method of Clause 5, wherein transmitting the capability message includes transmitting the capability message based on a random access process in the initial attach procedure.

Clause 7. The method of Clause 1, wherein the information element in the capability message indicates that the UE is capable of establishing multiple sidelinks with the at least one additional UE via a single carrier.

Clause 8. The method of Clause 7, wherein the configuration parameters correspond to configuration parameters for establishing the multiple sidelinks with the at least one additional UE via the single carrier.

Clause 9. The method of Clause 7, wherein the information element indicates that the UE is capable of establishing multiple sidelinks with the at least one additional UE via multiple bandwidth parts (BWPs) of the single carrier.

Clause 10. The method of Clause 9, wherein the configuration parameters correspond to configuration parameters for establishing the multiple sidelinks with the at least one additional UE via multiple bandwidth parts (BWPs) of the single carrier.

Clause 11. The method of Clause 7, wherein the information element indicates that the first UE is capable of establishing multiple sidelinks with the at least one additional UE via multiple subchannels of a single BWP of the single carrier.

Clause 12. The method of Clause 11, wherein the configuration parameters correspond to configuration parameters for establishing the multiple sidelinks with the at least one additional UE via multiple subchannels of a single BWP of the single carrier.

Clause 13. The method of Clause 1, wherein the information element indicates that the UE is capable of establishing multiple sidelinks with the at least one additional UE via a plurality of carriers.

Clause 14. The method of Clause 13, wherein the configuration parameters correspond to configuration parameters for establishing the multiple sidelinks with the at least one additional UE via the plurality of carriers.

Clause 15. The method of Clause 1, wherein the configuration parameters comprise resource pool configuration parameters of a plurality of resource pools for the multiple sidelinks.

Clause 16. The method of Clause 15, wherein the plurality of resource pools includes a first resource pool, wherein the first resource pool corresponds to resources for reception, by the first UE, of sidelink signals and sidelink channels associated with a first sidelink of the multiple sidelinks.

Clause 17. The method of Clause 16, wherein the plurality of resource pools includes a second resource pool, wherein the second recourse pool corresponds to resources for transmission, by the first UE, of sidelink signals and sidelink channels associated with the first sidelink.

Clause 18. The method of Clause 15, wherein first configuration parameters of a first resource pool, of the plurality of resource pools, comprise a frequency configuration of the first resource pool.

Clause 19. The method of Clause 18, wherein the frequency configuration comprises a sidelink frequency identifier corresponding to an identity of the frequency configuration.

Clause 20. The method of Clause 18, wherein the frequency configuration indicates radio resources associated with the first resource pool.

Clause 21. The method of Clause 1, wherein the configuration parameters comprise sidelink bandwidth part configuration parameters.

Clause 22. The method of Clause 1, wherein the configuration parameters comprise sidelink radio bearer configuration parameters.

Clause 23. The method of Clause 1, wherein the at least one RRC messages further comprise a first parameter indicating that a downlink control information (DCI) of a first format is configured for the UE for scheduling sidelink channel transmissions on multiple sidelinks.

Clause 24. The method of Clause 1 further comprising receiving, by the UE, a downlink control information (DCI) comprising scheduling information for sidelink transmissions on multiple sidelinks.

Clause 25. A method of capability signaling for sidelink communications comprising:

transmitting, by a first user equipment (UE), a capability message comprising an information element indicating a maximum number of sidelinks that the first UE is capable of establishing with at least one additional UEs;

receiving, by the first UE from the base station, at least one radio resource control (RRC) messages comprising configuration parameters for establishing a first number of sidelinks with the at least one additional UEs, wherein the first number is smaller than or equal to the maximum number; and communicating with the at least one second UEs using the established first number of sidelinks based on the configuration parameters.

Clause 26. The method of Clause 25, wherein transmitting the capability message, by the UE, transmitting the capability message in response to the first UE receiving a capability query message from the base station in a capability transfer procedure.

Clause 27. The method of Clause 25, wherein the capability query message comprises a radio access technology type information element set to new radio (NR).

Clause 28. The method of Clause 26, wherein the capability query message further comprises an information element indicating a request for sidelink capability information.

Clause 29. The method of Clause 25, wherein transmitting the capability message includes transmitting the capability message based on an initial attach procedure.

Clause 30. The method of Clause 29, wherein transmitting the capability message includes transmitting the capability message based on a random access process in the initial attach procedure.

Clause 31. The method of Clause 25, wherein the maximum number of sidelinks is for sidelinks across all carriers configured for the UE.

Clause 32. The method of Clause 25, wherein the maximum number of sidelinks is for sidelinks on a single carrier of the first UE.

Clause 33. The method of Clause 25, wherein the maximum number of sidelinks is for sidelinks on a single bandwidth part (BWP) of a single carrier of the first UE.

Clause 34. The method of Clause 25, wherein the maximum number of sidelinks is for sidelinks on a single subchannel of a single bandwidth part (BWP) of a single carrier of the first UE.

Clause 35. A method of capability signaling for sidelink communications, comprising:
  receiving, by a UE from a second UE, a sidelink capability message comprising at least one information elements associated with sidelink communication capabilities of the second UE;
  determining, by the first UE, at least one sidelink communication parameters based on the at least one information elements;
  communicating, by the first UE with the second UE, via one or more sidelinks based on the determined sidelink communication parameters.

Clause 36. The method of Clause 35, wherein the receiving of the sidelink capability message from the second UE occurs in response to transmitting a sidelink capability query message.

Clause 37. The method of Clause 35, wherein the sidelink capability message further comprises at least one second information elements associated with sidelink communication capabilities of a third UE, and wherein the at least one second information elements are received by the second UE from the third UE.

Clause 38. The method of Clause 35, wherein the at least one information elements indicate one or more of:
  a list of supported carriers for sidelink communications;
  a list of supported bands for sidelink communications;
  a list of supported band combination for sidelink;
  bandwidth capabilities for sidelink communications; and
  at least one sidelink features.

Clause 39. The method of Clause 35, wherein the at least one information elements indicate a maximum number of sidelinks supported by the second UE.

Clause 40. The method of Clause 35, wherein the at least one information elements indicate that the second UE is capable of supporting multiple sidelinks.

Clause 41. An apparatus for utilization in wireless communications comprising:
  an antenna for use in transmission of electromagnetic signals;
  a memory for maintaining computer-readable code; and
  a processor for executing the computer-readable code that causes the apparatus to:
  transmit a capability message comprising an information element indicating that a first UE is capable of establishing multiple sidelinks with at one additional UE;
  receive in response to transmitting the capability message, one or more radio resource control (RRC) messages comprising configuration parameters for establishing multiple sidelinks with the at least one additional UE; and
  communicate with the at least one additional UE using the multiple sidelinks based on the received configuration parameters.

Clause 42. The apparatus of Clause 41, wherein the apparatus transmits the capability message in response to the first UE receiving a capability query message from the base station in a capability transfer procedure.

Clause 43. The apparatus of Clause 42, wherein the capability query message comprises a radio access technology type information element set to new radio (NR).

Clause 44. The apparatus of Clause 42, wherein the capability query message comprises an information element indicating a request for sidelink capability information.

Clause 45. The apparatus of Clause 41, wherein the apparatus transmits the capability message based on an initial attach procedure.

Clause 46. The apparatus of Clause 45, wherein the apparatus transmits the capability message based on a random access process in the initial attach procedure.

Clause 47. The apparatus of Clause 41, wherein the information element in the capability message indicates that the UE is capable of establishing multiple sidelinks with the at least one additional UE via a single carrier.

Clause 48. The apparatus of Clause 47, wherein the configuration parameters correspond to configuration parameters for establishing the multiple sidelinks with the at least one additional UE via the single carrier.

Clause 49. The apparatus of Clause 47, wherein the information element indicates that the UE is capable of establishing multiple sidelinks with the at least one additional UE via multiple bandwidth parts (BWPs) of the single carrier.

Clause 50. The apparatus of Clause 49, wherein the configuration parameters correspond to configuration parameters for establishing the multiple sidelinks with the at least one additional UE via multiple bandwidth parts (BWPs) of the single carrier.

Clause 51. The apparatus of Clause 47, wherein the information element indicates that the first UE is capable of establishing multiple sidelinks with the at least one additional UE via multiple subchannels of a single BWP of the single carrier.

Clause 52. The apparatus of Clause 51, wherein the configuration parameters correspond to configuration parameters for establishing the multiple sidelinks with the at least one additional UE via multiple subchannels of a single BWP of the single carrier.

Clause 53. The apparatus of Clause 41, wherein the information element indicates that the UE is capable of establishing multiple sidelinks with the at least one additional UE via a plurality of carriers.

Clause 54. The apparatus of Clause 53, wherein the configuration parameters correspond to configuration parameters for establishing the multiple sidelinks with the at least one additional UE via the plurality of carriers.

Clause 55. The apparatus of Clause 41, wherein the configuration parameters comprise resource pool configuration parameters of a plurality of resource pools for the multiple sidelinks.

Clause 56. The apparatus of Clause 55, wherein the plurality of resource pools includes a first resource pool, wherein the first resource pool corresponds to resources for reception, by the first UE, of sidelink signals and sidelink channels associated with a first sidelink of the multiple sidelinks.

Clause 57. The apparatus of Clause 16, wherein the plurality of resource pools includes a second resource pool, wherein the second recourse pool correspond to resources for transmission, by the first UE, of sidelink signals and sidelink channels associated with the first sidelink.

Clause 58. The apparatus of Clause 55, wherein first configuration parameters of a first resource pool, of the plurality of resource pools, comprise a frequency configuration of the first resource pool.

Clause 59. The apparatus of Clause 58, wherein the frequency configuration comprises a sidelink frequency identifier corresponding to an identity of the frequency configuration.

Clause 60. The apparatus of Clause 58, wherein the frequency configuration indicates radio resources associated with the first resource pool.

Clause 61. The apparatus of Clause 41, wherein the configuration parameters comprise sidelink bandwidth part configuration parameters.

Clause 62. The apparatus of Clause 41, wherein the configuration parameters comprise sidelink radio bearer configuration parameters.

Clause 63. The apparatus of Clause 41, wherein the one or more RRC messages further comprise a first parameter indicating that a downlink control information (DCI) of a first format is configured for the UE for scheduling sidelink channel transmissions on multiple sidelinks.

Clause 64. The apparatus of Clause 41 further comprising receiving, by the UE, a downlink control information (DCI) comprising scheduling information for sidelink transmissions on multiple sidelinks.

Clause 65. An apparatus for utilization in wireless communications comprising:
  an antenna for use in transmission of electromagnetic signals;
  a memory for maintaining computer-readable code; and
  a processor for executing the computer-readable code that causes the apparatus to:
  transmit a capability message comprising an information element indicating a maximum number of sidelinks that a first UE is capable of establishing with one or more additional UEs;
  receive one or more radio resource control (RRC) messages comprising configuration parameters for establishing a first number of sidelinks with one or more additional UEs, wherein the first number is smaller than or equal to the maximum number; and
  communicate with the one or more second UEs using the established first number of sidelinks based on the configuration parameters.

Clause 66. The apparatus of Clause 65, wherein the apparatus transmits the capability message in response to the first UE receiving a capability query message from the base station in a capability transfer procedure.

Clause 67. The apparatus of Clause 65, wherein the capability query message comprises a radio access technology type information element set to new radio (NR).

Clause 68. The apparatus of Clause 66, wherein the capability query message further comprises an information element indicating a request for sidelink capability information.

Clause 69. The apparatus of Clause 65, wherein the apparatus transmits the capability message based on an initial attach procedure.

Clause 70. The apparatus of Clause 69, wherein the apparatus transmits the capability message based on a random access process in the initial attach procedure.

Clause 71. The apparatus of Clause 65, wherein the maximum number of sidelinks is for sidelinks across all carriers configured for the UE.

Clause 72. The apparatus of Clause 65, wherein the maximum number of sidelinks is for sidelinks on a single carrier of the first UE.

Clause 73. The apparatus of Clause 65, wherein the maximum number of sidelinks is for sidelinks on a single bandwidth part (BWP) of a single carrier of the first UE.

Clause 74. The apparatus of Clause 65, wherein the maximum number of sidelinks is for sidelinks on a single subchannel of a single bandwidth part (BWP) of a single carrier of the first UE.

Clause 75. An apparatus for utilization in wireless communications comprising:
  an antenna for use in transmission of electromagnetic signals;
  a memory for maintaining computer-readable code; and
  a processor for executing the computer-readable code that causes the apparatus to:
  receive a sidelink capability message comprising one or more information elements associated with sidelink communication capabilities of a second UE;
  determine one or more sidelink communication parameters based on the one or more information elements;
  communicate via one or more sidelinks based on the determined sidelink communication parameters.

Clause 76. The apparatus of Clause 75, wherein the apparatus receives the sidelink capability message in response to transmitting a sidelink capability query message.

Clause 77. The apparatus of Clause 75, wherein the sidelink capability message further comprises one or more second information elements associated with sidelink communication capabilities of a third UE, and wherein the one or more second information elements are received by the second UE from the third UE.

Clause 78. The apparatus of Clause 75, wherein the one or more information elements indicate one or more of:
  a list of supported carriers for sidelink communications;
  a list of supported bands for sidelink communications;
  a list of supported band combination for sidelink;
  bandwidth capabilities for sidelink communications; and
  one or more sidelink features.

Clause 79. The apparatus of Clause 75, wherein the one or more information elements indicate a maximum number of sidelinks supported by the second UE.

Clause 80. The apparatus of Clause 75, wherein the one or more information elements indicate that the second UE is capable of supporting multiple sidelinks.

Clause 81. A method of capability signaling for sidelink communications comprising:
  receiving a capability message comprising an information element indicating that a first UE is capable of establishing multiple sidelinks with at least one additional UE; and
  transmitting in response to transmitting the capability message, one or more radio resource control (RRC) messages comprising configuration parameters for establishing multiple sidelinks with the at least one additional UE;
  wherein the first UE communicates with the at least one additional UE using the multiple sidelinks based on the received configuration parameters.

Clause 82. The method of Clause 81, wherein receiving the capability message includes receiving the capability message in response to the first UE receiving a capability query message from the base station in a capability transfer procedure.

Clause 83. The method of Clause 82, wherein the capability query message comprises a radio access technology type information element set to new radio (NR).

Clause 84. The method of Clause 82, wherein the capability query message comprises an information element indicating a request for sidelink capability information.

Clause 85. The method of Clause 81, wherein receiving the capability message includes receiving the capability message based on an initial attach procedure.

Clause 86. The method of Clause 85, wherein receiving the capability message includes receiving the capability message based on a random access process in the initial attach procedure.

Clause 87. The method of Clause 81, wherein the information element in the capability message indicates that the UE is capable of establishing multiple sidelinks with the at least one additional UE via a single carrier.

Clause 88. The method of Clause 87, wherein the configuration parameters correspond to configuration parameters for establishing the multiple sidelinks with the at least one additional UE via the single carrier.

Clause 89. The method of Clause 87, wherein the information element indicates that the UE is capable of establishing multiple sidelinks with the at least one additional UE via multiple bandwidth parts (BWPs) of the single carrier.

Clause 90. The method of Clause 89, wherein the configuration parameters correspond to configuration parameters for establishing the multiple sidelinks with the at least one additional UE via multiple bandwidth parts (BWPs) of the single carrier.

Clause 91. The method of Clause 87, wherein the information element indicates that the first UE is capable of establishing multiple sidelinks with the at least one additional UE via multiple subchannels of a single BWP of the single carrier.

Clause 92. The method of Clause 91, wherein the configuration parameters correspond to configuration parameters for establishing the multiple sidelinks with the at least one additional UE via multiple subchannels of a single BWP of the single carrier.

Clause 93. The method of Clause 81, wherein the information element indicates that the UE is capable of establishing multiple sidelinks with the at least one additional UE via a plurality of carriers.

Clause 94. The method of Clause 93, wherein the configuration parameters correspond to configuration parameters for establishing the multiple sidelinks with the at least one additional UE via the plurality of carriers.

Clause 95. The method of Clause 81, wherein the configuration parameters comprise resource pool configuration parameters of a plurality of resource pools for the multiple sidelinks.

Clause 96. The method of Clause 95, wherein the plurality of resource pools includes a first resource pool, wherein the first resource pool corresponds to resources for reception, by the first UE, of sidelink signals and sidelink channels associated with a first sidelink of the multiple sidelinks.

Clause 97. The method of Clause 96, wherein the plurality of resource pools includes a second resource pool, wherein the second recourse pool correspond to resources for transmission, by the first UE, of sidelink signals and sidelink channels associated with the first sidelink.

Clause 98. The method of Clause 95, wherein first configuration parameters of a first resource pool, of the plurality of resource pools, comprise a frequency configuration of the first resource pool.

Clause 99. The method of Clause 98, wherein the frequency configuration comprises a sidelink frequency identifier corresponding to an identity of the frequency configuration.

Clause 100. The method of Clause 98, wherein the frequency configuration indicates radio resources associated with the first resource pool.

Clause 101. The method of Clause 81, wherein the configuration parameters comprise sidelink bandwidth part configuration parameters.

Clause 102. The method of Clause 81, wherein the configuration parameters comprise sidelink radio bearer configuration parameters.

Clause 103. The method of Clause 81, wherein the one or more RRC messages further comprise a first parameter indicating that a downlink control information (DCI) of a first format is configured for the UE for scheduling sidelink channel transmissions on multiple sidelinks.

Clause 104. The method of Clause 81 further comprising transmitting a downlink control information (DCI) comprising scheduling information for sidelink transmissions on multiple sidelinks.

Clause 105. A method of capability signaling for sidelink communications comprising:
  receiving a capability message comprising an information element indicating a maximum number of sidelinks that a first UE is capable of establishing with one or more additional UEs; and
  transmitting one or more radio resource control (RRC) messages comprising configuration parameters for establishing a first number of sidelinks with one or more additional UEs, wherein the first number is smaller than or equal to the maximum number;
  wherein the first UE communicates with the one or more second UEs using the established first number of sidelinks based on the configuration parameters.

Clause 106. The method of Clause 105, wherein transmitting the capability message, by the UE, transmitting the capability message in response to the first UE receiving a capability query message from the base station in a capability transfer procedure.

Clause 107. The method of Clause 105, wherein the capability query message comprises a radio access technology type information element set to new radio (NR).

Clause 108. The method of Clause 106, wherein the capability query message further comprises an information element indicating a request for sidelink capability information.

Clause 109. The method of Clause 105, wherein receiving the capability message, by the first UE, is based on an initial attach procedure.

Clause 110. The method of Clause 109, wherein receiving the capability message, by the first UE, is based on a random access process in the initial attach procedure.

Clause 111. The method of Clause 105, wherein the maximum number of sidelinks is for sidelinks across all carriers configured for the UE.

Clause 112. The method of Clause 105, wherein the maximum number of sidelinks is for sidelinks on a single carrier of the first UE.

Clause 113. The method of Clause 105, wherein the maximum number of sidelinks is for sidelinks on a single bandwidth part (BWP) of a single carrier of the first UE.

Clause 114. The method of Clause 105, wherein the maximum number of sidelinks is for sidelinks on a single subchannel of a single bandwidth part (BWP) of a single carrier of the first UE.

Clause 115. An apparatus for utilization in wireless communications comprising:
- an antenna for use in transmission of electromagnetic signals;
- a memory for maintaining computer-readable code; and
- a processor for executing the computer-readable code that causes the apparatus to:
  - receive a capability message comprising an information element indicating that a first UE is capable of establishing multiple sidelinks with at least one additional UE; and
  - transmit one or more radio resource control (RRC) messages comprising configuration parameters for establishing multiple sidelinks with the at least one additional UE;
  - wherein the first UE communicates with the at least one additional UE using the multiple sidelinks based on the received configuration parameters.

Clause 116. The apparatus of Clause 115, wherein the apparatus receives the capability message in response to the first UE receiving a capability query message from the base station in a capability transfer procedure.

Clause 117. The apparatus of Clause 116, wherein the capability query message comprises a radio access technology type information element set to new radio (NR).

Clause 118. The apparatus of Clause 116, wherein the capability query message comprises an information element indicating a request for sidelink capability information.

Clause 119. The apparatus of Clause 115, wherein the apparatus receives the capability message based on an initial attach procedure.

Clause 120. The apparatus of Clause 119, wherein the apparatus receives the capability message based on a random access process in the initial attach procedure.

Clause 121. The apparatus of Clause 115, wherein the information element in the capability message indicates that the UE is capable of establishing multiple sidelinks with the at least one additional UE via a single carrier.

Clause 122. The apparatus of Clause 121, wherein the configuration parameters correspond to configuration parameters for establishing the multiple sidelinks with the at least one additional UE via the single carrier.

Clause 123. The apparatus of Clause 121, wherein the information element indicates that the UE is capable of establishing multiple sidelinks with the at least one additional UE via multiple bandwidth parts (BWPs) of the single carrier.

Clause 124. The apparatus of Clause 123, wherein the configuration parameters correspond to configuration parameters for establishing the multiple sidelinks with the at least one additional UE via multiple bandwidth parts (BWPs) of the single carrier.

Clause 125. The apparatus of Clause 123, wherein the information element indicates that the first UE is capable of establishing multiple sidelinks with the at least one additional UE via multiple subchannels of a single BWP of the single carrier.

Clause 126. The apparatus of Clause 125, wherein the configuration parameters correspond to configuration parameters for establishing the multiple sidelinks with the at least one additional UE via multiple subchannels of a single BWP of the single carrier.

Clause 127. The apparatus of Clause 115, wherein the information element indicates that the UE is capable of establishing multiple sidelinks with the at least one additional UE via a plurality of carriers.

Clause 128. The apparatus of Clause 137, wherein the configuration parameters correspond to configuration parameters for establishing the multiple sidelinks with the at least one additional UE via the plurality of carriers.

Clause 129. The apparatus of Clause 115, wherein the configuration parameters comprise resource pool configuration parameters of a plurality of resource pools for the multiple sidelinks.

Clause 130. The apparatus of Clause 129, wherein the plurality of resource pools includes a first resource pool, wherein the first resource pool corresponds to resources for reception, by the first UE, of sidelink signals and sidelink channels associated with a first sidelink of the multiple sidelinks.

Clause 131. The apparatus of Clause 130, wherein the plurality of resource pools includes a second resource pool, wherein the second recourse pool correspond to resources for transmission, by the first UE, of sidelink signals and sidelink channels associated with the first sidelink.

Clause 132. The apparatus of Clause 129, wherein first configuration parameters of a first resource pool, of the plurality of resource pools, comprise a frequency configuration of the first resource pool.

Clause 133. The apparatus of Clause 132, wherein the frequency configuration comprises a sidelink frequency identifier corresponding to an identity of the frequency configuration.

Clause 134. The apparatus of Clause 132, wherein the frequency configuration indicates radio resources associated with the first resource pool.

Clause 135. The apparatus of Clause 115, wherein the configuration parameters comprise sidelink bandwidth part configuration parameters.

Clause 136. The apparatus of Clause 115, wherein the configuration parameters comprise sidelink radio bearer configuration parameters.

Clause 137. The apparatus of Clause 115, wherein the one or more RRC messages further comprise a first parameter indicating that a downlink control information (DCI) of a first format is configured for the UE for scheduling sidelink channel transmissions on multiple sidelinks.

Clause 138. The apparatus of Clause 115, wherein the apparatus transmits a downlink control information (DCI) comprising scheduling information for sidelink transmissions on multiple sidelinks.

Clause 139. An apparatus for utilization in wireless communications comprising:
- an antenna for use in transmission of electromagnetic signals;
- a memory for maintaining computer-readable code; and
- a processor for executing the computer-readable code that causes the apparatus to:
  - receive a capability message comprising an information element indicating a maximum number of sidelinks that a first UE is capable of establishing with one or more additional UEs; and
  - transmit one or more radio resource control (RRC) messages comprising configuration parameters for establishing a first number of sidelinks with one or more additional UEs, wherein the first number is smaller than or equal to the maximum number;

wherein the first UE communicates with the one or more second UEs using the established first number of sidelinks based on the configuration parameters.

Clause 140. The apparatus of Clause 139, wherein the apparatus transmits the capability message in response to the first UE receiving a capability query message from the base station in a capability transfer procedure.

Clause 141. The apparatus of Clause 139, wherein the capability query message comprises a radio access technology type information element set to new radio (NR).

Clause 142. The apparatus of Clause 140, wherein the capability query message further comprises an information element indicating a request for sidelink capability information.

Clause 143. The apparatus of Clause 139, wherein the apparatus receives the capability query message based on an initial attach procedure.

Clause 144. The apparatus of Clause 143, wherein the apparatus receives the capability query message based on a random access process in the initial attach procedure.

Clause 145. The apparatus of Clause 139, wherein the maximum number of sidelinks is for sidelinks across all carriers configured for the UE.

Clause 146. The apparatus of Clause 139, wherein the maximum number of sidelinks is for sidelinks on a single carrier of the first UE.

Clause 147. The apparatus of Clause 139, wherein the maximum number of sidelinks is for sidelinks on a single bandwidth part (BWP) of a single carrier of the first UE.

Clause 148. The apparatus of Clause 139, wherein the maximum number of sidelinks is for sidelinks on a single subchannel of a single bandwidth part (BWP) of a single carrier of the first UE.

The invention claimed is:

1. A method of capability signaling for sidelink communications comprising:
   transmitting, by a first user equipment (UE), a capability message comprising an information element indicating that the first UE is capable of establishing multiple sidelinks with at least one additional UE;
   receiving, by the first UE, at least one radio resource control (RRC) message comprising configuration parameters for establishing multiple sidelinks with the at least one additional UE; and
   communicating, by the first UE, with the at least one additional UE using the multiple sidelinks based on the received configuration parameters,
   wherein transmitting the capability message includes transmitting the capability message during an initial attach procedure, the initial attach procedure being a procedure in which the first UE and a base station initiate an RRC connection, and
   wherein the at least one RRC message further comprises a first parameter indicating that downlink control information (DCI) of a first format is configured for the first UE for scheduling sidelink channel transmissions on the multiple sidelinks.

2. The method of claim 1, wherein transmitting the capability message includes transmitting the capability message in response to the first UE receiving a capability query message from the base station in a capability transfer procedure.

3. The method of claim 2, wherein the capability query message comprises a radio access technology type information element set to new radio (NR).

4. The method of claim 2, wherein the capability query message comprises an information element indicating a request for sidelink capability information.

5. The method of claim 1, wherein transmitting the capability message includes transmitting the capability message based on a random access process in the initial attach procedure.

6. The method of claim 1, wherein the information element in the capability message indicates that the first UE is capable of establishing multiple sidelinks with the at least one additional UE via a single carrier.

7. The method of claim 6, wherein the configuration parameters correspond to configuration parameters for establishing the multiple sidelinks with the at least one additional UE via the single carrier.

8. The method of claim 6, wherein the information element indicates that the first UE is capable of establishing multiple sidelinks with the at least one additional UE via multiple bandwidth parts (BWPs) of the single carrier.

9. The method of claim 8, wherein the configuration parameters correspond to configuration parameters for establishing the multiple sidelinks with the at least one additional UE via multiple bandwidth parts (BWPs) of the single carrier.

10. The method of claim 6, wherein the information element indicates that the first UE is capable of establishing multiple sidelinks with the at least one additional UE via multiple subchannels of a single BWP of the single carrier.

11. The method of claim 10, wherein the configuration parameters correspond to configuration parameters for establishing the multiple sidelinks with the at least one additional UE via multiple subchannels of a single BWP of the single carrier.

12. The method of claim 1, wherein the information element indicates that the first UE is capable of establishing multiple sidelinks with the at least one additional UE via a plurality of carriers.

13. The method of claim 12, wherein the configuration parameters correspond to configuration parameters for establishing the multiple sidelinks with the at least one additional UE via the plurality of carriers.

14. The method of claim 1, wherein the configuration parameters comprise resource pool configuration parameters of a plurality of resource pools for the multiple sidelinks.

15. The method of claim 14, wherein the plurality of resource pools includes a first resource pool, wherein the first resource pool corresponds to resources for reception, by the first UE, of sidelink signals and sidelink channels associated with a first sidelink of the multiple sidelinks.

16. The method of claim 15, wherein the plurality of resource pools includes a second resource pool, wherein the second recourse pool corresponds to resources for transmission, by the first UE, of sidelink signals and sidelink channels associated with the first sidelink.

17. The method of claim 14, wherein first configuration parameters of a first resource pool, of the plurality of resource pools, comprise a frequency configuration of the first resource pool.

18. The method of claim 17, wherein the frequency configuration comprises a sidelink frequency identifier corresponding to an identity of the frequency configuration.

19. The method of claim 17, wherein the frequency configuration indicates radio resources associated with the first resource pool.

20. The method of claim 1, wherein the configuration parameters comprise sidelink bandwidth part configuration parameters.

21. The method of claim 1, wherein the configuration parameters comprise sidelink radio bearer configuration parameters.

22. The method of claim 1 further comprising receiving, by the UE, scheduling information for sidelink transmissions on the multiple sidelinks.

23. A method of capability signaling for sidelink communications comprising:
transmitting, by a first user equipment (UE), a capability message comprising an information element indicating a second number of sidelinks that the first UE is capable of establishing with at least one additional UE;
receiving, by the first UE from a base station, at least one radio resource control (RRC) message comprising configuration parameters for establishing a first number of sidelinks with the at least one additional UE, wherein the first number is smaller than or equal to the second number; and
communicating with the at least one additional UE using the established first number of sidelinks based on the configuration parameters,
wherein transmitting the capability message includes transmitting the capability message during an initial attach procedure, the initial attach procedure being a procedure in which the first UE and the base station initiate an RRC connection, and
wherein the at least one RRC message further comprises a first parameter indicating that downlink control information (DCI) of a first format is configured for the first UE for scheduling sidelink channel transmissions on the first number of sidelinks.

24. The method of claim 23, wherein transmitting the capability message, by the UE, comprises transmitting the capability message in response to the first UE receiving a capability query message from the base station in a capability transfer procedure.

25. The method of claim 24, wherein the capability query message comprises a radio access technology type information element set to new radio (NR).

26. The method of claim 24, wherein the capability query message further comprises an information element indicating a request for sidelink capability information.

27. The method of claim 23, wherein transmitting the capability message includes transmitting the capability message based on a random access process in the initial attach procedure.

28. The method of claim 23, wherein the second number of sidelinks is for sidelinks across all carriers configured for the first UE.

29. The method of claim 23, wherein the second number of sidelinks is for sidelinks on a single carrier of the first UE.

30. The method of claim 23, wherein the second number of sidelinks is for sidelinks on a single bandwidth part (BWP) of a single carrier of the first UE.

31. The method of claim 23, wherein the second number of sidelinks is for sidelinks on a single subchannel of a single bandwidth part (BWP) of a single carrier of the first UE.

32. A method of capability signaling for sidelink communications, comprising:
receiving, by a first UE from a second UE, a sidelink capability message comprising at least one information element associated with sidelink communication capabilities of the second UE;
determining, by the first UE, at least one sidelink communication parameters based on the at least one information element;
communicating, by the first UE with the second UE, via at least one sidelink based on the determined sidelink communication parameters,
wherein receiving the sidelink capability message includes receiving the capability message during an initial attach procedure, the initial attach procedure being a procedure in which the first UE and a base station initiate a radio resource control (RRC) connection, and
wherein at least one RRC message received by the first UE comprises a first parameter indicating that downlink control information (DCI) of a first format is configured for the first UE for scheduling sidelink channel transmissions on the at least one sidelink.

33. The method of claim 32, wherein the receiving of the sidelink capability message from the second UE occurs in response to transmitting a sidelink capability query message.

34. The method of claim 32, wherein the sidelink capability message further comprises at least one second information element associated with sidelink communication capabilities of a third UE, and wherein the at least one second information element is received by the second UE from the third UE.

35. The method of claim 32, wherein the at least one information element indicates one or more of:
a list of supported carriers for sidelink communications;
a list of supported bands for sidelink communications;
a list of supported band combination for sidelink;
bandwidth capabilities for sidelink communications; and
at least one sidelink feature.

36. The method of claim 32, wherein the at least one information element indicates a number of sidelinks supported by the second UE.

37. The method of claim 32, wherein the at least one information element indicates that the second UE is capable of supporting multiple sidelinks.

38. A method of capability signaling for sidelink communications comprising:
receiving a capability message comprising an information element indicating that a first UE is capable of establishing multiple sidelinks with at least one additional UE; and
transmitting in response to transmitting the capability message, one or more radio resource control (RRC) messages comprising configuration parameters for establishing multiple sidelinks with the at least one additional UE;
wherein the first UE communicates with the at least one additional UE using the multiple sidelinks based on the received configuration parameters,
wherein receiving the capability message includes receiving the capability message during an initial attach procedure, the initial attach procedure being a procedure in which the first UE and a base station initiate an RRC connection, and
wherein the one or more RRC messages further comprise a first parameter indicating that downlink control information (DCI) of a first format is configured for the first UE for scheduling sidelink channel transmissions on the multiple sidelinks.

39. A method of capability signaling for sidelink communications comprising:
receiving a capability message comprising an information element indicating a second number of sidelinks that a first UE is capable of establishing with one or more additional UEs; and transmitting one or more radio resource control (RRC) messages comprising configuration parameters for establishing a first number of sidelinks with one or more additional UEs, wherein the first number is smaller than or equal to the second number;

wherein the first UE communicates with the one or more second UEs using the established first number of sidelinks based on the configuration parameters, wherein receiving the capability message includes receiving the capability message during an initial attach procedure, the initial attach procedure being a procedure in which the first UE and a base station initiate an RRC connection, and wherein the one or more RRC messages further comprise a first parameter indicating that downlink control information (DCI) of a first format is configured for the first UE for scheduling sidelink channel transmissions on the first number of sidelinks.

* * * * *